(12) United States Patent
Brown et al.

(10) Patent No.: US 12,723,393 B2
(45) Date of Patent: Sep. 1, 2026

(54) URINAL SCREENS

(71) Applicant: Fresh Products, Inc., Perrysburg, OH (US)

(72) Inventors: Douglas S. Brown, Toledo, OH (US); Jeffrey A. Smith, Perrysburg, OH (US)

(73) Assignee: Fresh Products, Inc., Perrysburg, OH (US)

( * ) Notice: Subject to any disclaimer, the term of this patent is extended or adjusted under 35 U.S.C. 154(b) by 343 days.

(21) Appl. No.: 18/165,524

(22) Filed: Feb. 7, 2023

(65) Prior Publication Data

US 2024/0011273 A1 Jan. 11, 2024

Related U.S. Application Data

(63) Continuation of application No. 16/770,272, filed as application No. PCT/US2018/066302 on Dec. 18, 2018, now Pat. No. 11,585,078.

(Continued)

(51) Int. Cl.

*E03D 13/00* (2006.01)
*B29C 43/02* (2006.01)

(Continued)

(52) U.S. Cl.

CPC ........ *E03D 13/005* (2013.01); *B29C 45/0053* (2013.01); *B29C 45/0055* (2013.01);

(Continued)

(58) Field of Classification Search

CPC ............ B29C 37/0017; B29C 37/0053; B29C 37/301; B29C 33/0027; B29C 33/0033;

(Continued)

(56) References Cited

U.S. PATENT DOCUMENTS 333,935 A 1/1886 Duncan
487,130 A 11/1892 Schoen (Continued)

FOREIGN PATENT DOCUMENTS

CN 3680203 8/2007
CN 201649256 U 11/2010

(Continued)

OTHER PUBLICATIONS

Machine English translation of Inoue et al. (JP-2017186861-A) (Year: 2017).*

(Continued)

*Primary Examiner* — Jeffrey M Wollschlager
*Assistant Examiner* — Edgaredmanuel Troche
(74) *Attorney, Agent, or Firm* — KNOBBE, MARTENS, OLSON & BEAR, LLP

(57) ABSTRACT

A urinal screen can include a frame having: a first face; a second face opposite the first face; and a plurality of apertures extending through the first and second faces. The urinal screen can include a plurality of first posts extending from the first face of the frame and configured to at least partially dissipate splashing of urine that impacts the urinal screen; and a plurality of second posts extending from the second face of the frame and configured to at least partially dissipate splashing of urine that impacts the urinal screen; wherein: at least ⅓ majority of the plurality of first and second posts are parallel to each other; at least ⅓ of the plurality of second posts are parallel to each other; and the at least ⅓ majority of the plurality of firsts posts extend at a non-perpendicular angle from with respect to the first face of the frame.

16 Claims, 32 Drawing Sheets

Related U.S. Application Data

(60) Provisional application No. 62/693,248, filed on Jul. 2, 2018, provisional application No. 62/680,394, filed on Jun. 4, 2018, provisional application No. 62/608,455, filed on Dec. 20, 2017.

(51) Int. Cl.
*B29C 45/00* (2006.01)
*B29C 33/00* (2006.01)
*B29C 37/00* (2006.01)
*B29C 45/26* (2006.01)
*B29C 45/40* (2006.01)

(52) U.S. Cl.
CPC ...... *B29C 33/0033* (2013.01); *B29C 37/0053* (2013.01); *B29C 2043/026* (2013.01); *B29C 45/2626* (2013.01); *B29C 45/40* (2013.01)

(58) Field of Classification Search
CPC ..... B29C 33/30; B29C 33/301; B29C 33/485; B29C 2045/026; B29C 2045/0082; B29C 2043/026; B29C 45/0053; B29C 45/0055; B29C 45/2626; B29C 45/40; E03C 1/181; B21D 37/12; E03D 13/005; E03D 9/00; E03D 9/007; H04L 41/0843; H04L 63/0236; H04L 63/0272; H04L 63/08; H04L 63/1441; H04L 63/20; H04L 63/101; H04L 63/102; A47L 25/00
USPC ............... 264/243, 297.2, 299, 220; 132/901
See application file for complete search history.

(56) References Cited

U.S. PATENT DOCUMENTS 539,698 A 5/1895 Milligan
555,888 A 3/1896 Roberts
557,762 A 4/1896 Brockman
571,275 A 11/1896 Maxwell et al.
639,628 A 12/1899 Thomsen et al.
675,947 A 6/1901 Hack
810,973 A 1/1906 Pattenden et al.
927,026 A 7/1909 Clayton
950,574 A 3/1910 Morgan
1,109,904 A 9/1914 Dahlgren
1,186,345 A 6/1916 Sleight
1,208,675 A 12/1916 Sleight
1,260,082 A 3/1918 Sleight
1,292,856 A 1/1919 Niblo
1,731,431 A 10/1929 Meyer
1,880,962 A 10/1932 Koppelman
1,886,676 A 11/1932 Heuacker
1,935,128 A 11/1933 Pullman
2,011,732 A 8/1935 Saeks
2,020,864 A 11/1935 Aronson et al.
2,087,592 A 7/1937 Chesnut
2,211,970 A 8/1940 Fischer
2,233,234 A 2/1941 Wilson
2,447,178 A 8/1948 Hatchette
2,506,669 A 5/1950 Heuacker
2,508,808 A 5/1950 Warman
2,679,054 A 5/1954 Singleton
2,690,569 A 10/1954 Kozerski
2,931,047 A 4/1960 Stebbins
2,984,841 A 5/1961 Wilson
3,005,209 A 10/1961 Timmons
D194,776 S 3/1963 Clark
D194,777 S 3/1963 Clark
3,170,169 A 2/1965 Clark
3,237,330 A 3/1966 Dinstbir
3,248,740 A 5/1966 Wisnom
3,268,920 A 8/1966 Beer
3,329,998 A 7/1967 Stohr
3,387,069 A 6/1968 Stohr
3,422,558 A 1/1969 Fee
3,540,433 A 11/1970 Brockman
3,559,353 A 2/1971 Partridge
3,597,772 A 8/1971 Leavitt et al.
3,599,677 A 8/1971 O'Brien
3,614,790 A 10/1971 Billingsly et al.
3,631,560 A 1/1972 Atkins
3,723,998 A 4/1973 Wehr
3,752,121 A 8/1973 Brazzell
3,760,429 A 9/1973 Brownstein
3,788,485 A 1/1974 Bruning
3,804,796 A 4/1974 Alexandre
3,824,633 A 7/1974 Van Vlahakis
3,837,988 A 9/1974 Hennen et al.
3,867,953 A 2/1975 Stohr
3,899,192 A 8/1975 Reddaway
3,923,442 A 12/1975 Stohr
3,935,602 A 2/1976 Kale
4,010,497 A 3/1977 Menter et al.
4,095,031 A 6/1978 Engle
4,103,367 A 8/1978 Kaufer
D253,145 S 10/1979 Adam
D255,744 S 7/1980 Dekko
4,212,153 A 7/1980 Kydonieus et al.
4,215,443 A 8/1980 Babik
4,230,582 A 10/1980 Tuleja
D258,181 S 2/1981 Adam
D258,472 S 3/1981 Adam
4,305,216 A 12/1981 Skelton
4,361,606 A 11/1982 Butler et al.
4,389,963 A 6/1983 Pearson
4,405,509 A 9/1983 Rogers et al.
4,408,557 A 10/1983 Bradley et al.
4,418,432 A 12/1983 Vidal
4,440,542 A 4/1984 Foley
4,490,862 A 1/1985 Vidal
4,515,909 A 5/1985 Sawano et al.
D280,267 S 8/1985 Bryant et al.
4,549,693 A 10/1985 Barlics
4,552,693 A 11/1985 Hussain et al.
4,557,863 A 12/1985 Callewaert et al.
4,574,400 A 3/1986 Annowsky
4,574,403 A 3/1986 Dintemann et al.
4,604,357 A 8/1986 Callewaert et al.
4,612,676 A 9/1986 Whitman
4,615,926 A 10/1986 Hsu et al.
4,671,976 A * 6/1987 Vidal ..................... E03C 1/264 4/293
4,750,219 A 6/1988 Williams
4,761,437 A 8/1988 Christie
4,815,767 A 3/1989 Lambert
4,830,407 A 5/1989 Sadler, Jr. et al.
4,866,793 A 9/1989 Luedtke et al.
4,941,688 A 7/1990 Jones
D312,740 S 12/1990 Greenhut et al.
4,985,940 A 1/1991 Jones
5,010,599 A 4/1991 Nilsson
5,019,434 A 5/1991 Matsumoto
5,058,088 A 10/1991 Haas et al.
5,058,523 A 10/1991 Mikkonen et al.
5,087,273 A 2/1992 Ward
D327,534 S 6/1992 Manville et al.
5,117,515 A 6/1992 White, Jr. et al.
5,130,016 A 7/1992 Gavin
5,139,864 A 8/1992 Lindauer
D329,893 S 9/1992 Luedtke et al.
5,150,481 A 9/1992 Pang
5,150,722 A 9/1992 Rutherford
5,165,119 A 11/1992 Yamato
5,188,755 A 2/1993 Chang
D341,414 S 11/1993 Baker
5,309,578 A 5/1994 Temple, Sr.
5,313,672 A 5/1994 Luedtke et al.
5,336,424 A 8/1994 Vlahakis et al.
5,364,132 A 11/1994 Haas et al.
5,365,616 A 11/1994 Morad
D353,445 S 12/1994 Morad
5,377,362 A 1/1995 Jackson
D355,807 S 2/1995 O'Rourke

(56) References Cited

U.S. PATENT DOCUMENTS 5,398,347 A 3/1995 Luedtke et al.
D360,714 S 7/1995 d'Alquen
5,472,712 A 12/1995 Oshlack et al.
5,479,735 A 1/1996 Martin, Jr.
5,482,007 A 1/1996 Kumlin
5,489,415 A 2/1996 Van Vlahakis et al.
5,496,300 A 3/1996 Hirsch et al.
D370,938 S 6/1996 Roach
D372,515 S 8/1996 Douglas
5,556,685 A 9/1996 Swicegood, Jr.
5,580,578 A 12/1996 Oshlack et al.
5,604,937 A 2/1997 Davenport
5,639,476 A 6/1997 Oshlack et al.
5,660,138 A 8/1997 Hirsch
5,665,439 A 9/1997 Andersen et al.
5,719,828 A 2/1998 Haas et al.
D393,896 S 4/1998 Wagner et al.
5,774,905 A 7/1998 Wager et al.
5,809,590 A 9/1998 Williams et al.
5,813,058 A 9/1998 Quigley et al.
5,867,848 A 2/1999 Ort
5,885,701 A 3/1999 Berman et al.
5,958,334 A 9/1999 Haddon
5,961,148 A 10/1999 Cheng
D422,061 S 3/2000 Lee
6,055,681 A 5/2000 Lyons
D427,295 S 6/2000 Wagner
6,076,222 A 6/2000 Jolly
6,079,975 A 6/2000 Conover
6,081,937 A 7/2000 Whitacre
6,103,201 A 8/2000 Green
6,103,351 A 8/2000 Ram et al.
6,113,148 A 9/2000 Koranda et al.
D438,710 S 3/2001 Chen
6,207,236 B1 3/2001 Araki et al.
6,213,409 B1 4/2001 Warren et al.
D442,246 S 5/2001 McCabe et al.
6,244,208 B1 6/2001 Qui et al.
6,257,540 B1 7/2001 Kresch
6,265,084 B1 7/2001 Stickler
6,269,490 B1 8/2001 Suski et al.
6,279,759 B1 8/2001 Weisbach
D456,492 S 4/2002 Lourens
6,370,705 B1 4/2002 Levinson
D464,122 S 10/2002 Mangan
6,517,759 B1 2/2003 Ferenc et al.
6,640,350 B1 11/2003 Deutsch
6,698,035 B1 3/2004 Grueser
6,703,012 B1 3/2004 White
6,730,311 B2 5/2004 Maleeny et al.
6,787,210 B2 9/2004 Stickler
D497,277 S 10/2004 Ruhl et al.
6,823,533 B2 11/2004 Casari
6,862,754 B1 3/2005 DeMarco
6,920,648 B1 7/2005 Suski et al.
6,927,199 B2 8/2005 Takemura et al.
6,988,462 B1 1/2006 Zhu
D520,610 S 5/2006 Wrate
7,061,831 B2 6/2006 De La Huerga
D528,193 S 9/2006 Lee
7,127,844 B2 10/2006 Collins
7,202,201 B1 4/2007 Williams
D561,327 S 2/2008 Dejonge
7,398,565 B1 7/2008 Chou
7,413,082 B2 8/2008 Adler et al.
7,419,588 B2 9/2008 Lawson
7,434,535 B2 10/2008 Adamy
D584,863 S 1/2009 Garry et al.
7,528,102 B2 5/2009 Barthel et al.
D598,075 S 8/2009 Uhl
7,597,949 B2 10/2009 Wright
D612,914 S 3/2010 Morad
7,742,367 B2 6/2010 Haas
7,808,861 B2 10/2010 Wien
7,833,515 B2 11/2010 Corzani et al.
D630,714 S 1/2011 Dukes
7,886,958 B2 2/2011 Smith
7,904,972 B2 3/2011 Anderson
7,921,479 B2 4/2011 Hunter
7,921,583 B2 4/2011 Londino
D639,410 S 6/2011 Ramirez
7,959,694 B2 6/2011 Braunschweig et al.
8,007,707 B1 8/2011 Brown
8,043,498 B2 10/2011 Rueda
D678,482 S 3/2013 Williams
D678,483 S 3/2013 Barker
D682,398 S 5/2013 Lee
D687,524 S 8/2013 Heiser
D687,525 S 8/2013 Heiser
D703,409 S 4/2014 Robbins, III et al.
8,856,977 B2 10/2014 Ramirez
D730,493 S 5/2015 Sehl
9,243,394 B2 1/2016 Brown et al.
9,303,396 B1 4/2016 Pernici
9,334,641 B2 5/2016 Kobal
D778,411 S 2/2017 Brown et al.
D778,412 S 2/2017 Brown et al.
D778,423 S 2/2017 Buzanowski et al.
D790,042 S 6/2017 Ramirez
D805,613 S 12/2017 D'Amico et al.
D806,835 S 1/2018 D'Amico et al.
D806,836 S 1/2018 D'Amico et al.
D806,837 S 1/2018 D'Amico et al.
D824,495 S 7/2018 D'Amico et al.
D824,496 S 7/2018 D'Amico et al.
10,036,154 B2 7/2018 Crevier
10,087,612 B2 10/2018 Brown et al.
10,145,098 B2 12/2018 Brown et al.
D838,818 S 1/2019 Malesky et al.
D841,359 S 2/2019 Crevier
10,267,027 B2 4/2019 D'Amico et al.
10,294,649 B2 5/2019 Crevier
D857,181 S 8/2019 Brown
10,501,924 B2 12/2019 Brown et al.
D873,974 S 1/2020 Helton
D874,617 S 2/2020 Chen
D875,896 S 2/2020 Dukes et al.
10,612,226 B2 4/2020 Hurd et al.
10,640,959 B2 5/2020 Malesky et al.
D893,682 S 8/2020 McDanal et al.
D920,485 S 5/2021 Crevier
D925,009 S 7/2021 Brown et al.
11,198,997 B2 12/2021 Brown et al.
D956,936 S 7/2022 Kim
11,396,745 B2 7/2022 Brown et al.
D960,329 S 8/2022 Brown et al.
11,505,935 B2 11/2022 Crevier
11,585,078 B2 2/2023 Brown et al.
11,781,305 B2 10/2023 Brown et al.
D1,016,991 S 3/2024 Kuipers
D1,017,774 S 3/2024 Chen
D1,039,121 S 8/2024 Brown et al.
D1,045,032 S 10/2024 Helton
12,139,900 B2 11/2024 Brown et al.
D1,060,616 S 2/2025 Chen
D1,061,821 S 2/2025 Chen
D1,061,822 S 2/2025 Chen
12,247,381 B2 3/2025 Brown et al.
D1,074,942 S 5/2025 Depoti et al.
D1,078,945 S 6/2025 Brown et al.
12,352,031 B2 7/2025 Crevier
D1,107,871 S 12/2025 Brown et al.
2002/0037385 A1 3/2002 Pignot et al.
2003/0044326 A1 3/2003 Yamasaki et al.
2005/0022298 A1 2/2005 de Leon et al.
2005/0067106 A1 3/2005 Melges
2005/0112339 A1 5/2005 Sandel et al.
2005/0133516 A1 6/2005 Dyer
2005/0144711 A1 7/2005 Valadez et al.
2005/0169793 A1 8/2005 Wheatley et al.
2005/0245671 A1 11/2005 Moon et al.
2005/0283892 A1 12/2005 Simeone et al.
2006/0232059 A1 10/2006 Fortune et al.
2006/0260032 A1 11/2006 Smartt

(56) References Cited

U.S. PATENT DOCUMENTS

2007/0023539 A1 2/2007 Brown et al.
2007/0039089 A1 2/2007 Worrel
2007/0044221 A1 3/2007 Wise
2007/0161927 A1 7/2007 Daugirdas
2007/0186337 A1 8/2007 Emr
2007/0266486 A1 11/2007 Ramirez
2007/0286984 A1 12/2007 Wright
2008/0098505 A1 5/2008 Casari
2008/0100057 A1 5/2008 MacPhee
2008/0292509 A1 11/2008 D'Amico
2009/0070923 A1 3/2009 Ruedas
2009/0229511 A1 9/2009 Campbell et al.
2009/0255053 A1 10/2009 Cutrone, III
2010/0183694 A1 7/2010 Burke et al.
2010/0257664 A1 10/2010 Kener
2011/0296597 A1* 12/2011 Brown ................ B29C 45/0001 4/222.1
2014/0007336 A1 1/2014 Mills et al.
2014/0075663 A1 3/2014 Irwin et al.
2014/0076991 A1 3/2014 Irwin et al.
2014/0157501 A1 6/2014 D'Amico
2014/0259344 A1 9/2014 Muderlak et al.
2015/0047114 A1 2/2015 Ramirez
2016/0023388 A1* 1/2016 Jacob .................. A46D 1/0261 425/542
2016/0102451 A1 4/2016 Brown et al.
2016/0122992 A1* 5/2016 Brown .................... E03D 9/007 4/256.1
2017/0067243 A1 3/2017 Valencia Garcia
2017/0096808 A1 4/2017 D'Amico et al.
2018/0023278 A1 1/2018 Brown et al.
2018/0080210 A1 3/2018 Hurd et al.
2018/0119403 A1 5/2018 Crevier
2018/0347161 A1 12/2018 Malesky et al.
2019/0145088 A1 5/2019 Keune
2019/0292764 A1 9/2019 Crevier
2021/0238838 A1 8/2021 Crevier
2022/0412066 A1 12/2022 Dalton
2023/0151602 A1 5/2023 Brown et al.

FOREIGN PATENT DOCUMENTS

CN 103321290 9/2013
CN 203296150 U 11/2013
CN 203458322 3/2014
CN 203905131 U 10/2014
CN 206346295 U 7/2017
DE 1915249 A1 10/1970
DE 19541911 A1 5/1997
DE 102012005147 A1 9/2013
EP 0153946 A1 9/1985
EP 3081705 A1 10/2016
EP 3202990 8/2017
FR 2618173 1/1989
FR 2681232 A1 3/1993
GB 189518394 A 8/1896
GB 350854 A 6/1931
GB 2092216 8/2000
GB 2431101 A 4/2007
GB 2473273 A 3/2011
GB 2472377 9/2011
JP 57-17599 1/1982
JP 60-178497 11/1985
JP 60-190865 12/1985
JP 63-116585 7/1988
JP 1990-102625 A 4/1990
JP 1992-119880 U 10/1992
JP 2001-303642 10/2001
JP 2017-186861 10/2017
JP 2017186861 A * 10/2017
KR 100351178 5/2002
KR 20-0337763 1/2004
KR 20-0351953 Y1 5/2004
KR 0368846 U 11/2004
KR 20-0395055 Y1 9/2005
TR 201514932 U * 1/2016
WO WO 98/30621 A1 7/1998
WO WO 2005/093177 10/2005
WO WO 2014/043725 A1 3/2014
WO WO 2015/088303 6/2015
WO WO 2016/060998 A1 4/2016
WO WO 2016/144153 9/2016
WO WO 2019/126217 A1 6/2019

OTHER PUBLICATIONS

Machine English translation of TR-201514932-U (Year: 2016).*

Plaintiff Fresh Products, Inc., Complaint for Patent Infringement Demand for Jury Trial, Case No. 2:19-cv-05994, filed Jul. 11, 2019.

Defendant Impact Products, LLC, Answer And Affirmative Defenses Demand For Jury Trial, Case No. 2:19-cv-05994 GW(AFMx), filed Sep. 4, 2019.

Fresh Products, Inc.'s First Amended Complaint, Case No. 3:19-cv-02109-JZ, with Exhibits, filed Feb. 4, 2020 in 55 pages.

Defendant Impact Products, LLC's Answer and Affirmative Defenses to First Amended Complaint, Case No. 3:19-cv-02109-JZ, filed Feb. 18, 2020 in 9 pages.

Defendant Impact Products, LLC, Invalidity Contentions, Demand For Jury Trial, Case No. 3:19-cv-02109-JZ, with Exhibits, filed Apr. 8, 2020 in 813 pages.

Fresh Products, Inc.'s Opening Claim Construction Brief, Case No. 3:19-cv-02109-JZ, filed Aug. 4, 2020 in 30 pages.

Defendant Impact Products, LLC's Opening Claim Construction Brief, Case No. 3:19-cv-02109-JZ, with Exhibits, filed Aug. 4, 2020 in 370 pages.

Defendant Impact Products, LLC's Responsive Claim Construction Brief, Case No. 3:19-cv-02109-JZ, with exhibits, dated Sep. 3, 2020.

Fresh Products, Inc.'s Responsive Claim Construction Brief, Case No. 3:19-cv-02109-JZ, dated Sep. 3, 2020.

Joint Claim Construction and Prehearing Statement, Case No. 3:19-cv-02109-JZ, dated Sep. 8, 2020.

Joint Notice of Additional Agreed-Upon Claim Constructions, Case No. 3:19-cv-02109-JZ, dated Oct. 28, 2020.

Transcript of Video Claim Construction Hearing Proceedings Before the Honorable Jack Zouhary, United States Senior District Judge, Case No. 3:19-CV-2109, dated Nov. 16, 2020.

Joint Notice of Additional Agreed-Upon Claim Constructions, Case No. 3:19-cv-02109-JZ, dated Nov. 17, 2020.

Markman Order, Case No. 3:19-cv-02109-JZ, dated Nov. 24, 2020.

Dismissal and Order re Validity and Enforceability, Case No. 3:19-cv-02109-JZ, dated Feb. 3, 2021.

Non-Infringement and Invalidity Contentions [with Exhibits 1-7], Case No. CIV-21-00211-F, dated Aug. 20, 2021.

Order Regarding Claim Construction, *Big D Industries, Inc.*, v. *Fresh Products, Inc.*, Case No. 5:21-cv-00211-F, May 6, 2022.

Order Regarding Claim Construction, *Big D Industries, Inc.*, v. *Fresh Products, Inc.*, Case No. 5:21-cv-00211-F, Apr. 5, 2022.

Complaint, *Big D Industries, Inc.*, v. *Fresh Products, Inc.*, Case No. 5:22-cv-00182-PRW, Mar. 2, 2022.

Fresh Products Final Infringement Contentions, *Big D Industries, Inc.*, v. *Fresh Products, Inc.*, Case No. 5:21-cv-00211-F, Jun. 15, 2022.

Expert Report of Nathan J. Macdonald, Case No. CIV-21-211-F, Oct. 21, 2022.

Expert Report of Randy Hurd, PH.D., Case No. 5:21-cv-00211-F, Sep. 23, 2022.

Declaration of Sean Stewart, dated Mar. 23, 2022, with exhibits, in 30 pages.

Fresh Products, Inc., The Wave 2.0 Flyer, in 1 page.

Big D Product Catalog, Jan. 2013, in 16 pages.

Dugdale, David C., "Uroflowmetry" MedlinePlus Medical Encyclopedia, 2008. http://www.nlm.nih.gov/medlineplus/ency/article/003325.htm, retrieved on Oct. 28, 2014, 2 pages.

Fresh Products Tidal Wave Urinal Screen, YouTube Video Frame 0: 19/1 :23, Publish Date Sep. 20, 2017, Visited Online May 26, 2020, https://www.youtube.com/watch?v=G_g2_ 1NtE2l&feature=emb_logo (Year: 2017).

(56) References Cited

OTHER PUBLICATIONS

Fresh Products 3WDS60SAP Wave 3-D Urinal Deodorizer Screen, Red; Spiced Apple Fragrance; indicated as first available date May 10, 2013; visited online Feb. 5, 2022; https://www.amazon.com/Fresh-Products-3WDS60SAP-Deodorizer-Fragrance/dp/B00MX5A9ME/ref=pd_Ipo_2?pd_rd_i=B00MX5A9ME&psc=1.
Fresh Products Wave 3-D Urinal Screen, Herbal Mint; indicated as first available date Sep. 3, 2014; visited online Feb. 5, 2022; https://www.amazon.com/Fresh-Products-Urinal-Screen-Herbal/dp/B00NA58YGE.
Gray, Henry. "The Male Urethra". Anatomy of the Human Body, 3b. 4, 1918. http://www.bartleby.com/107/256.html, retrieved on Oct. 27, 2014. 5 pages.
Ritter, R. C. et al., "Analysis of Drop Intervals in Jets Modelling Obstruction of the Urinary Tract," Physics in Medicine and Biology, 1974, vol. 19, No. 2, 161-170, 11 pages.
Ritter, R. C. et al., "Physical Information in the External Urinary Stream of the Normal and Obstructed Adult Male," British Journal of Urology, 1977, vol. 49, 293-302, 10 pages.
The Pearl 3D® urinal screen product cut sheet, and 3D renderings of The Pearl 3D urinal screen product, in three pages. The cut sheet includes a date of Sep. 2013; however, Applicant makes no representations as to the accuracy of this date. Applicant further makes no representation as to whether the 3D renderings accurately represent the product shown in the cut sheet and as to whether the 3D renderings accurately represent any prior art product. Applicant requests that the Examiner review the reference as prior art. Applicant reserves the right to disqualify the reference as prior art if needed.
International Search Report and Written Opinion for application No. PCT/US2018/066302, dated May 24, 2019, in 26 pages.
Non-Final Office Action in U.S. Appl. No. 29/701,433, dated Feb. 9, 2022, in 24 pages.
Fresh Products Slant7 urinal screen, best splash prevention, easy installation, long-lasting fragrance—fabulous, purple, made in USA, lasts for 30 days, 10pk urinal screens, available in Amazon.com, date first available Aug. 7, 2020, site visited Jul. 19, 2023, https://www.amazon.com/Fresh-Products-Prevention-Installation-Long-Lasting/dp/B08FF94W2B (2020).
Fresh Products, Inc.'s Answer to Complaint and Counterclaim, Case No. 0:24-cv-01454-JMB-ECW, May 9, 2024.
Complaint for Declaratory Judgement of Invalidity and Noninfringement, *Vectair Systems Inc.* v. *Fresh Products, Inc.*, Case No. 0:24-cv-01454-JMB-ECW, Apr. 20, 2024, with exhibits.
Petition for Inter Partes Review of U.S. Pat. No. 10,145,098, *Vectair Systems Inc.* v. *Fresh Products, Inc.*, Apr. 19, 2024, with exhibits.
Vectair's Answer to Fresh Products, Inc.'s First Amended Counterclaim, Case No. 0:24-cv-01454-JMB-ECW, Jun. 13, 2024, in 26 pages.
Patent Owner Preliminary Response, *Vectair Systems Inc.*, Petitioner, v. *Fresh Products, Inc.*, Patent Owner, Case No. IPR2024-00824, U.S. Pat. No. 10,145,098, dated Aug. 13, 2024, in 49 pages.
Vectair Systems Inc.'s Invalidity Contentions, *Vectair Systems Inc.*, Plaintiff and Counterclaim Defendant, v. *Fresh Products, Inc.*, Defendant and Counterclaimant, Civil No. 0:24-cv-01454-JMB-ECW, dated Aug. 24, 2024, in 829 pages.
Fresh Products, Inc.'s Answer to Complaint and First Amended Counterclaim, *Vectair Systems Inc.*, Plaintiff, v. *FreshProducts, Inc.*, Defendant, *Fresh Products, Inc.* Counter-Claimant, v. *Vectair Systems Inc.*, Counter-Defendant, Case No. 0:24-cv-01454-JMB-ECW, filed on May 30, 2024, in 119 pages.
Fresh Products, Inc.'s Answer to "Vectair's Additional Counterclaim", Case No. 0:24-cv-01454-JMB-ECW, filed on Jul. 3, 2024, in 12 pages.
Fresh Products, Inc.'s Response to Vectair Systems Inc.'s Invalidity Contentions, *Vectair Systems Inc.*, Plaintiff, v. *Fresh Products, Inc.*, Defendant, Civil Action No. 0:24-cv-01454-JMB-ECW, dated Sep. 30, 2024, in 408 pages.
Joint Claim Construction Statement, *Vectair Systems Inc.* v. *Fresh Products, Inc. and Fresh Products, inc.* v. *Vectair Systems, Inc.*, Civil Action No. 0:24-cv-01454-JMG-ECW, dated Dec. 11, 2024, in 44 pages.
Decision Denying Institution of Inter Partes Review, *Vectair Systems, Inc.* v. *FreshProducts, inc.*, IPR2024-00824, U.S. Pat. No. 10,145,098, dated Nov. 12, 2024, in 24 pages.
Fresh Products Wave 3D Urinal Screen Sep. 3, 2014 found on Jan. 29, 2025 at https://www.amazon.com/Fresh-Products-Urinal-Screen-Blossom/dp/B00NA58VAI?th=1 (2014).
International Preliminary Report on Patentability in PCT/US2018/066302 dated Jun. 23, 2020.
Complaint, *Sanastar Inc., d/b/a Wizkid Products* v. *Fresh Products LLC*, Case No. 25-cv-00418, filed Mar. 3, 2025, in 139 pages.
Plaintiff's Vectair System Inc.'s Motion to Streamline the Number of Asserted Claims, *Vectair Systems Inc.* v. *Fresh Products, Inc.*, case No. 0:24-cv-01454-JMB-ECW, dated Mar. 24, 2025, in 13 pages.
Vectair Systems Inc.'s Opening Claim Construction Brief, *Vectair Systems Inc.* v. *Fresh Products, Inc.*, Civil Action No. 0:24-cv-01454-JMG-ECW, dated Apr. 29, 2025, with exhibits, redacted version, in 137 pages.
Fresh Products, Inc.'s Opening Claim Construction Brief, *Vectair Systems Inc.* v. *Fresh Products, Inc.*, Civil Action No. 0:24-cv-01454-JMG-ECW, dated Apr. 29, 2025, with exhibits, in 213 pages.
Fresh Products LLC's Answer to Complaint and Counterclaims, *Sanastar Inc., d/b/a Wizkid Products* v. *Fresh Products LLC and Fresh Products LLC* v. *Sanastar Inc., d/b/a Wizkid Products*, Civil Action No. 3:25-cv-00418-JZ, filed Apr. 30, 2025, in 17 pages.
Vectair Systems Inc.'s Responsive Claim Construction Brief, *Vectair Systems Inc.* v. *Fresh Products, Inc.*, Civil Action No. 0:24-cv-01454-JMG-ECW, dated May 20, 2025, with exhibits, in 62 pages.
Fresh Products, Inc.'s Responsive Claim Construction Brief, *Vectair Systems Inc.* v. *Fresh Products, Inc.*, Civil Action No. 0:24-cv-01454-JMG-ECW, dated May 20, 2025, with exhibits, redacted version, in 90 pages.
Petition for Inter Partes Review of U.S. Pat. No. 10,294,649, filed Jul. 31, 2025, *Fresh Products, LLC* v. *Sanastar, Inc. d/b/a Wizkid Products*, IPR2025-01366, with exhibits, in 649 pages.
Petition for Inter Partes Review of U.S. Pat. No. 10,036,154, filed Jul. 23, 2025, *Fresh Products, LLC* v. *Sanastar, Inc. d/b/a Wizkid Products*, IPR2025-01339, with exhibits, in 654 pages.
Declaration of Randy Hurd, Ph.D., in Support of Fresh Products, Inc.'s Responsive Claim Construction Brief, *Vectair Systems Inc.* v. *Fresh Products, Inc.*, Civil Action No. 0:24-cv-01454-JMG-ECW, dated May 20, 2025, in 32 pages.
Petitioner's Opposition to Patent Owner's Motion for Discretionary Denial, *Fresh Products, LLC* v. *Sanastar, Inc. d/b/a Wizkid Products*, IPR2025-01339, U.S. Pat. No. 10,036,154, filed Oct. 29, 2025, with exhibits, in 81 pages.
Patent Owner's Preliminary Response, *Fresh Products, LLC* v. *Sanastar, Inc. d/b/a/ Wizkid Products*, IPR2025-01339, U.S. Pat. No. 10,036,154, filed Oct. 23, 2025, in 52 pages.
Patent Owner's Motion for Discretionary Denial Under 35 U.S.C. § 314(a), *Fresh Products, LLC* v. *Sanastar, Inc. d/b/a/ Wizkid Products*, IPR2025-01339, Patent No. 10,036,154 and IPR2025-01366, Patent No. 10,294,649, filed Sep. 23, 2025, with exhibits, in 282 pages.
Petitioner's Opposition to Patent Owner's Motion for Discretionary Denial, *Fresh Products, LLC* v. *Sanastar, Inc. d/b/a Wizkid Products*, IPR2025-01366, U.S. Pat. No. 10,294,649, dated Oct. 29, 2025, with exhibits, in 81 pages.
Patent Owner's Preliminary Response, *Fresh Products, LLC* v. *Sanastar, Inc., d/b/a Wizkid Products*, IPR2025-01366, U.S. Pat. No. 10,294,649, dated Oct. 31, 2025, 52 pages.
Patent Owner's Amended Motion for Discretion Denial Under 35 U.S.C. § 314(a), *Fresh Products, LLC* v. *Sanastar, Inc. d/b/a Wizkid Products*, IPR2025-01366, U.S. Pat. No. 10,294,649, dated Sep. 29, 2025, with exhibits, in 278 pages.
British Plastics Federation, Ethylene Vinyl Acetate (EVA), accessed on Sep. 23, 2025, at: https://www.bpf.co.uk/plastipedia/polymers/EVA.aspx, in 3 pages (2025).

(56) References Cited

OTHER PUBLICATIONS

Kota et al., "Designing compliant mechanisms", Mechanical Engineering, vol. 117(11):93-97 (1995).
Notice of Decisions on Institution, *Fresh Products, LLC* v. *Sanastar, Inc. d/b/a/ Wizkid Products*, IPR2025-01339, U.S. Pat. No. 10,036,154, and *Fresh Products, LLC* v. *Sanastar, Inc., d/b/a Wizkid Products*, IPR2025-01366, U.S. Pat. No. 10,294,649, dated Nov. 20, 2025, 2 pages.

* cited by examiner

URINAL SCREENS

CROSS-REFERENCE TO RELATED APPLICATIONS

This application is a continuation of U.S. patent application Ser. No. 16/770,272, filed Jun. 5, 2020, titled URINAL SCREENS, which is a national stage entry under 35 U.S.C. §371 of International Application No. PCT/US2018/066302, filed Dec. 18, 2018, titled URINAL SCREENS, which claims priority to U.S. Provisional Patent App. No. 62/693,248, filed Jul. 2, 2018, titled URINAL SCREENS; U.S. Provisional Patent App. No. 62/680,394, filed Jun. 4, 2018, titled URINAL SCREENS; and U.S. Provisional Patent App. No. 62/608,455, filed Dec. 20, 2017, titled URINAL SCREENS. Each of the foregoing applications is hereby incorporated by reference herein in its entirety.

TECHNICAL FIELD

Certain embodiments discussed herein relate to restroom screens and mats, and, more particularly, the present inventions relate to restroom urinal screens and mats.

DISCUSSION OF THE RELATED ART

Urinal screens are widely used to prevent debris from being flushed down a urinal drain. In some cases, a fragrance is provided with the screens to help sanitize and freshen the air in and around the urinal.

SUMMARY

According to some embodiments, a urinal screen comprises: a frame having: an outer perimeter; a first face; a second face opposite the first face; and a plurality of apertures extending through the first and second faces, each of the plurality of apertures defined at least partially by a perimeter structure; and a first set of posts extending from the first face of the frame, each of the posts of the first set of posts having a first end connected to the frame and a second end spaced from the frame; wherein: at least some of the posts of the first set of posts extend at a first non-perpendicular angle with respect to the first face of the frame and are positioned such that they obstruct a view of at least one of the plurality of apertures when viewed normal to the first face, wherein the at least some of the posts of the first set of posts can at least partially dissipate splashing of urine that impacts the urinal screen; and at least some of the perimeter structures comprise a side wall oriented at a second non-perpendicular angle with respect to the first face of the frame, wherein the at least some of the perimeter structures can at least partially dissipate splashing of urine that impacts the urinal screen.

In some embodiments, the first non-perpendicular angle is equal to the second non-perpendicular angle. In some embodiments, the first non-perpendicular angle is within 10% of the second non-perpendicular angle. In some embodiments, the first non-perpendicular angle is between 15 degrees and 75 degrees and the second non-perpendicular angle is between 15 degrees and 75 degrees. In some embodiments, a majority of the plurality of apertures are positioned such that the perimeter structure that at least partially defines the aperture has at least three posts extending therefrom, with only one of the second ends of the at least three posts positioned to obstruct a view of the aperture when viewed normal to the first face. In some embodiments, each of the at least three posts is connected to a different corner of the perimeter structure. In some embodiments, a majority of the plurality of apertures are positioned such that the perimeter structure that at least partially defines the aperture has at least six posts extending therefrom, with only one of the second ends of the at least six posts positioned to obstruct a view of the aperture when viewed normal to the first face. In some embodiments, each of the at least six posts is connected to a different corner of the perimeter structure. In some embodiments, the second end of at least one of the posts of the first set of posts is positioned outside of the outer perimeter of the frame when observed from a position normal to the first face of the frame. In some embodiments, the urinal screen further comprises a second set of posts extending from the second face of the frame, each of the posts of the second set of posts having a first end connected to the frame and a second end spaced from the frame, wherein, when the urinal screen is placed on a surface of a urinal with the second face of the frame facing the surface of the urinal, the second set of posts can at least partially dissipate splashing of a urine stream after the urine stream passes through the plurality of apertures. In some embodiments, at least some of the posts of the second set of posts extend at a third non-perpendicular angle with respect to the first face of the frame. In some embodiments, the second end of at least one of the posts of the second set of posts is positioned outside the outer perimeter of the frame when observed from a position normal to the second face of the frame. In some embodiments, the third non-perpendicular angle comprise a same value as the first non-perpendicular angle. In some embodiments, the third non-perpendicular angle comprises a same value as the first non-perpendicular angle and the second non-perpendicular angle. In some embodiments, the at least some of the posts of the first set of posts are parallel to the at least some of the second set of posts. In some embodiments, one or more of the plurality of apertures overlaps at least one post of the first set of posts when observed from a position normal to the first face of the frame. In some embodiments, each of the plurality of apertures overlaps at least one post of the first set of posts when observed from a position normal to the first face of the frame. In some embodiments, each of the posts of the first set of posts has a longitudinal axis, and wherein the first and second ends of each of the posts lie on the longitudinal axis of the post. In some embodiments, each of the posts of the second set of posts are parallel to each of the posts of the first set of posts. In some embodiments, a total number of posts extending from the first face of the frame is equal to a total number of posts extending from the second face of the frame. In some embodiments, a total number of posts extending from the first face of the frame is within 10% of a total number of posts extending from the second face of the frame. In some embodiments, the second end of the at least one of the posts of the second set of posts that is positioned outside of the outer perimeter of the frame when observed from a position normal to the second face of the frame is positioned on a side of the frame opposite a second end of at least one of the posts of the first set of posts that is positioned outside of the outer perimeter of the frame when observed from a position normal to the first face of the frame. In some embodiments, each of the posts in the first set of posts has a length measured between the first and second ends of the post and a base width measured perpendicular to the length at the first end of the post, wherein a ratio between the base width and the length is within a range of 1:6 to 1:3. In some embodiments, each of the posts in the first set of posts has a length measured between the first and second ends of the post, a base width measured perpendicular to the length at the first end of the post, and a tip width measured perpendicular to the length of the posts adjacent the second end of the posts, wherein a ratio between the tip width and the base width is within a range of 1:5 to 1:2. In some embodiment, the plurality of apertures are a majority of a total number of apertures defined by the frame. In some embodiments, the plurality of apertures are at least ⅛, ¼, ⅜, ½, ⅝, ¾, or ⅞, of a total number of apertures defined by the frame. In some embodiments, the plurality of apertures are all of the apertures defined by the frame.

According to some embodiments, a urinal screen comprises: a frame having: a first face; a second face opposite the first face; and a plurality of apertures extending through the first and second faces; a plurality of first posts extending from the first face of the frame and configured to at least partially dissipate splashing of urine that impacts the urinal screen; and a plurality of second posts extending from the second face of the frame and configured to at least partially dissipate splashing of urine that impacts the urinal screen; wherein: at least ⅓ of the plurality of first posts are parallel to each other; at least ⅓ of the plurality of second posts are parallel to each other; and the at least ⅓ of the plurality of firsts posts extend at a non-perpendicular angle with respect to the first face of the frame.

In some embodiments, the non-perpendicular angle is less than or equal to 75 degrees. In some embodiments, the non-perpendicular angle is between 15 degrees and 75 degrees. In some embodiments, the at least ⅓ of the plurality of second posts are parallel to the at least ⅓ of the plurality of first posts. In some embodiments, a longitudinal axis of each of the at least ⅓ of the plurality of second posts is aligned with a longitudinal axis of each of the at least ⅓ of the plurality of first posts. In some embodiments, the at least ⅓ of the plurality of second posts extend at a non-perpendicular angle with respect to the first face of the frame. In some embodiments, the non-perpendicular angle at which the at least ⅓ of the plurality of second posts extend is congruent to the non-perpendicular angle at which the at least ⅓ of the plurality of first posts extend. In some embodiments, a first height of the at least ⅓ of the plurality of first posts, measured perpendicular to the first face, is greater than a second height of the at least ⅓ of the plurality of second posts, measured perpendicular to the second face. In some embodiments, a ratio of the first height to the second height is at least 2:1. In some embodiments, a ratio of the first height to the second height is at least 3:1. In some embodiments, a ratio of the first height to the second height is at least 4:1. In some embodiments, the second height is equal to or greater than a thickness of the frame, measured perpendicular to the first face. In some embodiments, at least a portion of the plurality of apertures comprise a side wall oriented at the same non-perpendicular angle as the at least ⅓ of the plurality of first posts, the side wall configured to at least partially dissipate splashing of urine that impacts the urinal screen. In some embodiments, at least ⅓ of the plurality of apertures comprise a side wall oriented at a non-perpendicular angle with respect to the first face of the frame, the side wall configured to at least partially dissipate splashing of urine that impacts the urinal screen. In some embodiments, at least ½ of the plurality of first posts are parallel to each other, and at least ½ of the plurality of second posts are parallel to each other. In some embodiments, at least ⅔ of the plurality of first posts are parallel to each other, and at least ⅔ of the plurality of second posts are parallel to each other. In some embodiments, at least ¾ of the plurality of first posts are parallel to each other, and at least ¾ of the plurality of second posts are parallel to each other. In some embodiments, the at least ⅓ of the plurality of first posts each comprise a first end connected to the frame and a second end spaced from the frame, wherein the second end of each of a majority of the at least ⅓ of the plurality of first posts is positioned to at least partially obstruct a view through one of the plurality of apertures when the urinal screen is observed normal to the first face. In some embodiment, the plurality of apertures are a majority of a total number of apertures defined by the frame. In some embodiments, the plurality of apertures are at least ⅛, ¼, ⅜, ½, ⅝, ¾, or ⅞, of a total number of apertures defined by the frame. In some embodiments, the plurality of apertures are all of the apertures defined by the frame.

According to some embodiments, a urinal screen comprises: a frame having: a first face; a second face opposite the first face; and a plurality of apertures extending through the first and second faces; a plurality of first posts extending from the first face of the frame, each of the plurality of first posts comprising a base portion connected to the frame and an end portion spaced from the frame; and a plurality of second posts extending from the second face of the frame, each of the plurality of second posts comprising a base portion connected to the frame and an end portion space from the frame; wherein, when the urinal screen is placed on a surface of a urinal with the second face of the frame facing the surface of the urinal, the plurality of first posts can at least partially dissipate splashing of a urine stream before the urine stream passes through the plurality of apertures, and the plurality of second posts can at least partially dissipate splashing of the urine stream after the urine stream passes through the plurality of apertures; wherein, for each of at least ⅓ of the plurality of first posts, a vector that passes through a center of the base portion and a center of the end portion is oriented at a first non-perpendicular angle with respect to the first face of the frame; and wherein, for each of at least ⅓ of the plurality of second posts, a vector that passes through a center of the base portion and a center of the end portion is oriented at a second non-perpendicular angle with respect to the first face of the frame.

In some embodiments, the first non-perpendicular angle is between 15 degrees and 75 degrees and the second non-perpendicular angle is between 15 degrees and 75 degrees. In some embodiments, the vector for each of the at least ⅓ of the plurality of first posts is parallel to the vector for each of the at least ⅓ of the plurality of second posts. In some embodiments, the first non-perpendicular angle is congruent to the second non-perpendicular angle. In some embodiments, the at least ⅓ of the plurality of first posts and the at least ⅓ of the plurality of second posts comprise a non-linear shape. In some embodiments, at least ⅓ of the plurality of apertures comprise a side wall oriented at a non-perpendicular angle with respect to the first face of the frame, the side wall configured to at least partially dissipate splashing of the urine stream. In some embodiments, at least some of the end portions of the at least ⅓ of the plurality of first posts and the at least ⅓ of the plurality of second posts extend outside an outer perimeter of the frame, when the urinal screen is observed normal to the first face. In some embodiments, at least some of the end portions of the at least ⅓ of the plurality of first posts and the at least ⅓ of the plurality of second posts are positioned to at least partially obstruct a view through one of the plurality of apertures when the urinal screen is observed normal to the first face. In some embodiment, the plurality of apertures are a majority of a total number of apertures defined by the frame. In some embodiments, the plurality of apertures are at least ⅛, ¼, ⅜, ½, ⅝, ¾, or ⅞, of a total number of apertures defined by the frame. In some embodiments, the plurality of apertures are all of the apertures defined by the frame.

According to some embodiments, a urinal screen comprises: a frame having: a first face; a second face opposite the first face; and a plurality of apertures extending through the first and second faces, each of the plurality of apertures defined at least partially by a perimeter structure; and a plurality of first posts extending from the first face of the frame, each of the plurality of first posts comprising a first end connected to the frame and a second end spaced from the frame; wherein a majority of the plurality of apertures are each positioned with at least two of the plurality of first posts connected to the perimeter structure that at least partially defines the aperture; wherein at least one of the at least two of the plurality of first posts is oriented with its second end positioned outside of the perimeter structure when viewed normal to the first face; wherein at least one of the at least two of the plurality of first posts is oriented with its second end positioned at least partially obstructing a view of the aperture when viewed normal to the first face; and wherein the plurality of first posts are configured to at least partially dissipate splashing of urine that impacts the urinal screen.

In some embodiments, the perimeter structure comprises a polygonal shape. In some embodiments, each of the at least two of the plurality of first posts is connected to a corner of the polygonal shape. In some embodiments, each of the at least two of the plurality of first posts is connected to a side of the polygonal shape. In some embodiments, the second end of one or more of the plurality of first posts is positioned outside of an outer perimeter of the frame when viewed normal to the first face. In some embodiments, the urinal screen further comprises: a plurality of second posts extending from the second face of the frame, each of the plurality of second posts comprising a first end connected to the frame and a second end spaced from the frame; wherein a majority of the plurality of apertures are each positioned with at least two of the plurality of first posts connected to the perimeter structure that at least partially defines the aperture; wherein at least one of the at least two of the plurality of second posts is oriented with its second end positioned outside of the perimeter structure when viewed normal to the first face; wherein at least one of the at least two of the plurality of second posts is oriented with its second end positioned at least partially obstructing a view of the aperture when viewed normal to the first face; and wherein, when the urinal screen is placed on a surface of a urinal with the second face of the frame facing the surface of the urinal, the plurality of second posts can at least partially dissipate splashing of a urine stream after the urine stream passes through the plurality of apertures. In some embodiment, the plurality of apertures are a majority of a total number of apertures defined by the frame. In some embodiments, the plurality of apertures are at least ⅛, ¼, ⅜, ½, ⅝, ¾, or ⅞, of a total number of apertures defined by the frame. In some embodiments, the plurality of apertures are all of the apertures defined by the frame.

According to some embodiments, a method of manufacturing a urinal screen comprises: molding a urinal screen comprising: a frame having a first face, a second face opposite the first face, and a plurality of apertures extending through the first and second faces; and a plurality of first posts extending from the first face of the frame, each of the plurality of first posts comprising a first end connected to the frame and a second end spaced from the frame; and applying a force to at least a portion of the plurality of first posts, resulting in plastic deformation of the at least a portion of the plurality of first posts such that a vector that passes through a center of the first end and a center of the second end is oriented at a non-perpendicular angle with respect to the first face of the frame.

In some embodiments, the non-perpendicular angle is between 15 degrees and 75 degrees. In some embodiments, the at least a portion of the plurality of first posts comprises at least ⅓ of the plurality of first posts. In some embodiments, the force is applied to the second end of the at least a portion of the plurality of first posts. In some embodiments, the force is applied to a portion between the first end and the second end of the at least a portion of the plurality of first posts. In some embodiments, the method further comprises: applying heat to the at least a portion of the plurality of first posts prior to or during applying the force to the at least a portion of the plurality of first posts. In some embodiments, the urinal screen further comprises a plurality of second posts extending from the second face of the frame, each of the plurality of second posts comprising a first end connected to the frame and a second end spaced from the frame; and wherein the method further comprises applying a force to at least a portion of the plurality of second posts, resulting in plastic deformation of the at least a portion of the plurality of second posts such that a vector that passes through a center of the first end and a center of the second end is oriented at a second non-perpendicular angle with respect to the second face of the frame. In some embodiments, the second non-perpendicular angle is between 15 degrees and 75 degrees. In some embodiments, the applying a force to the at least a portion of the plurality of second posts occurs concurrently with the applying a force to the at least a portion of the plurality of first posts.

According to some embodiments, a urinal screen comprises: a frame having: an outer perimeter; a first face; a second face opposite the first face; and a plurality of apertures extending through the first and second faces; and a first set of posts extending from the first face of the frame, each of posts of the first set of posts having a first end connected to the frame and a second end spaced from the frame; wherein: at least one of the posts of the first set of posts extends at a non-perpendicular angle from the first face of the frame; and wherein the second end of at least one of the posts of the first set of posts is positioned outside of the outer perimeter of the frame when observed from a position normal to the first face of the frame.

In some embodiments, the urinal screen further comprises a second set of posts extending from the second face of the frame, each of the posts of the second set of posts having a first end connected to the frame and a second end spaced from the frame. In some embodiments, at least one of the posts of the second set of posts extends at a non-perpendicular angle from the second face of the frame. In some embodiments, the second end of at least one of the posts of the second set of posts is positioned outside the outer perimeter of the frame when observed from a position normal to the second face of the frame. In some embodiments, the at least one of the posts of the second set of posts that extends at a non-perpendicular angle from the second face of the frame is parallel to at least one of the first set of posts. In some embodiments, the at least one of the posts of the first set of posts that extends at a non-perpendicular angle from the first face of the frame is parallel to at least one of the second set of posts. In some embodiments, one or more of the apertures overlaps at least one post of the first set of posts when observed from a position normal to the first face of the frame. In some embodiments, each of the plurality of apertures overlaps at least one post of the first set of posts when observed from a position normal to the first face of the frame. In some embodiments, each of the posts of the first set of posts has a longitudinal axis, and wherein the first and second ends of each of the posts lie on the longitudinal axis of the post. In some embodiments, each of the posts of the second set of posts are parallel to each of the posts of the first set of posts. In some embodiments, a total number of posts extending from the first face of the frame is equal to a total number of posts extending from the second face of the frame. In some embodiments, the second end of the at least one of the posts of the second set of posts that is position outside of the outer perimeter of the frame when observed from a position normal to the second face of the frame is positioned on a side of the frame opposite the second end of at least one of the posts of the first set of posts that is positioned outside of the outer perimeter of the frame when observed from a position normal to the first face of the frame.

According to some embodiments, a urinal screen comprises: a frame having: a first face; a second face opposite the first face; and a plurality of apertures extending through the first and second faces; a plurality of first posts extending from the first face of the frame; and a plurality of second posts extending from the second face of the frame; wherein: a majority of the first and second posts are parallel to each other; and a majority of the firsts posts extend at a non-perpendicular angle from the first face of the frame.

In some embodiments, at least ⅔ of the first and second posts are parallel to each other. In some embodiments, at least ¾ of the first and second posts are parallel to each other.

According to some embodiments, a urinal screen comprises: a frame having: a first face; a second face opposite the first face; and a plurality of apertures extending through the first and second faces; a plurality of first posts extending at a non-perpendicular angle from the first face of the frame and extending outside an outer perimeter of the frame; and a plurality of second posts extending from the second face of the frame.

According to some embodiments, a urinal screen comprises: a frame comprising a first region and a second region, wherein each of the first region and second region comprises: a first face; a second face opposite the first face; and a plurality of apertures extending through the first and second faces; a plurality of first posts extending from the first face of the first region, each of the plurality of first posts comprising a first end connected to the frame and a second end spaced from the frame; a plurality of second posts extending from the first face of the second region, each of the plurality of second posts comprising a first end connected to the frame and a second end spaced from the frame; wherein the first region surrounds the second region.

In some embodiments, a majority of the plurality of apertures of the first region comprise a different shape than a majority of the plurality of apertures of the second region. In some embodiments, at least some of the plurality of first posts are not parallel to at least some of the plurality of second posts. In some embodiments, a majority of the plurality of first posts are not parallel to a majority of the plurality of second posts. In some embodiments, a majority of the plurality of first posts extend from the first face of the first region at a non-perpendicular angle with respect to the first face of the first region, and wherein a majority of the plurality of second posts extend from the first face of the second region at a perpendicular angle with respect to the first face of the second region. In some embodiments, the urinal screen further comprises: a plurality of third posts extending from the second face of the first region, each of the plurality of third posts comprising a first end connected to the frame and a second end spaced from the frame; and a plurality of fourth posts extending from the second face of the second region, each of the plurality of fourth posts comprising a first end connected to the frame and a second end spaced from the frame. In some embodiments, the first region comprises a different color than the second region.

BRIEF DESCRIPTION OF THE DRAWINGS

The present inventions are described with reference to the accompanying drawings, in which like reference characters reference like elements, and wherein.

DETAILED DESCRIPTION

Figure 1:
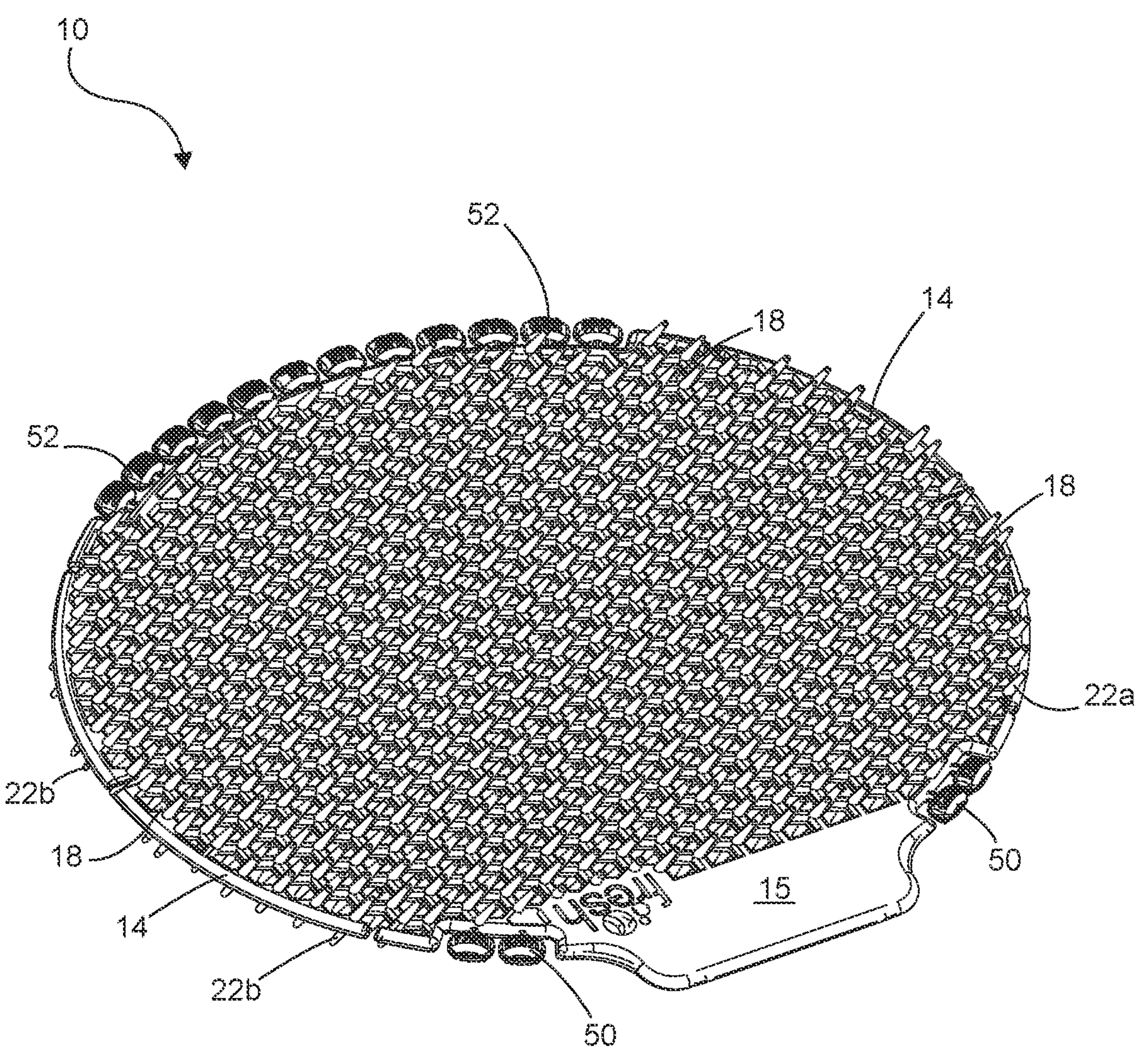
FIG. 1 is a top perspective view of a urinal screen.
Figure 2:
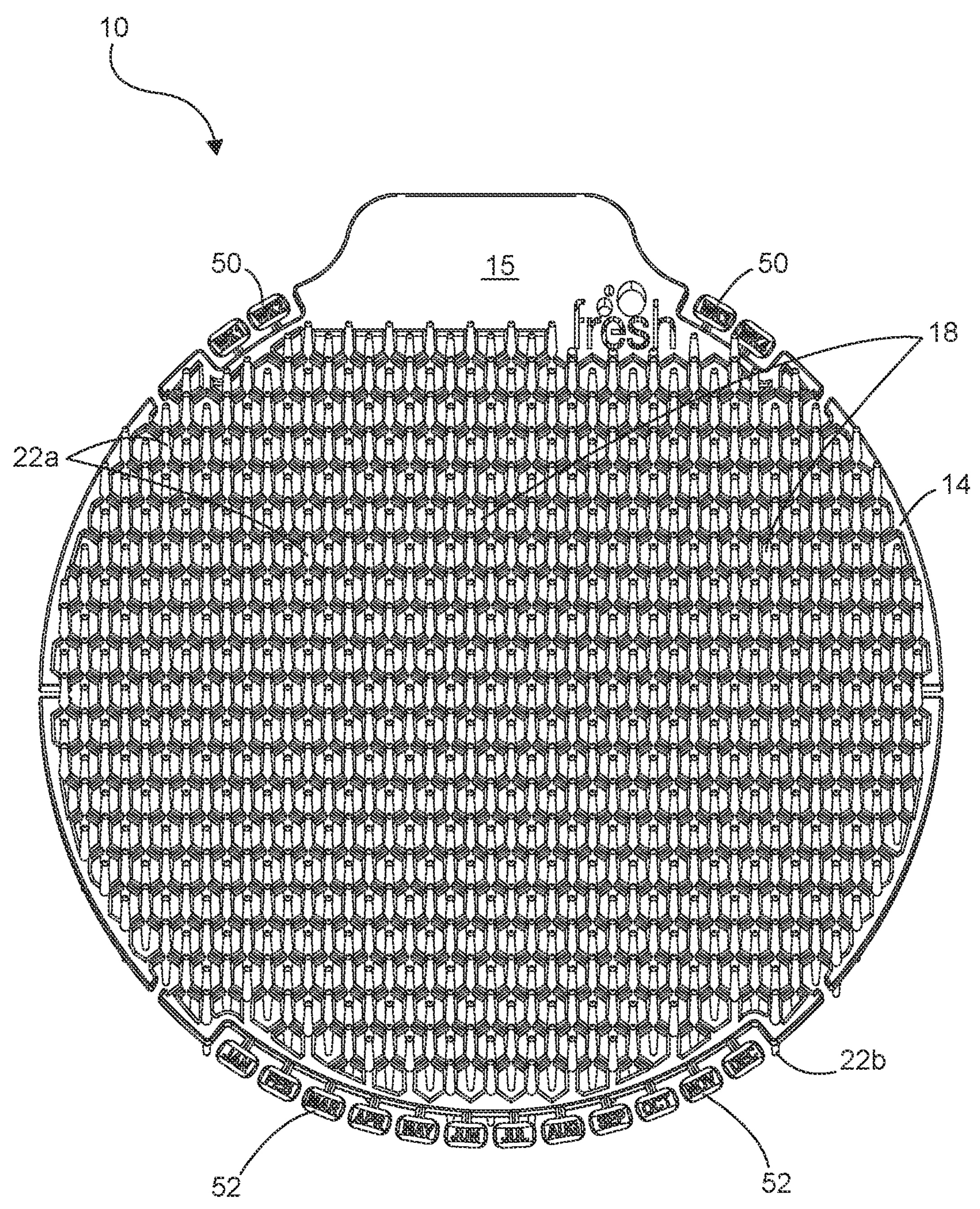
FIG. 2 is a top plan view of the urinal screen of FIG. 1.

An embodiment of a urinal screen 10 is illustrated in FIGS. 1-2. The urinal screen 10 can be sized and shaped to fit into a urinal, toilet, or other bathroom appliance. As illustrated, the urinal screen 10 can include a frame 14. The frame 14 can include the portions of the screen 10 from which protrusions, tabs, graphics, or other features can extend. The frame 14 can define the substrate or support for the screen 10 (e.g., the structure onto which and through which each of the other features are formed or connected). The frame 14 can be sized and shaped to fit over all or a portion of a drain of a toilet or urinal. The frame 14 can define a plurality of openings 18 (best illustrated in FIG. 4) through a thickness of the frame 14. In some embodiments, the urinal screen 10 includes a plurality of posts or structural supports 22*a*, 22*b* extending from one or more surfaces of the frame 14. In some embodiments, the entirety of the screen 10 separate from the posts 22*a*, 22*b* and tabs/solid cells 50, 52 (see below) comprises the frame 14 of the screen 10.

In some embodiments, the screen 10 has a polygonal, elliptical, circular, or other overall shape. For example, as illustrated in FIG. 2, the screen 10 can have a generally circular shape, though many other shapes are contemplated (e.g., rectangles, pentagons, triangles, circles, or some combination thereof). In some embodiments, the screen 10 is shaped to fit a particular urinal or toilet. The overall shape of the screen 10 can comprise the outer edges of the frame 14, including any tabs or solid cells 50, 52. For example, as used herein, the outer perimeter of the frame 14 can include the outer perimeter of the frame 14 and any solid cells 50, 52 extending therefrom, as observed normal to a surface upon which the frame 14 is set.

The frame 14 and/or posts 22*a*, 22*b* can be constructed from a polymeric or other solid material. For example, the frame 14 and/or posts 22*a*, 22*b* can be constructed using a 3D printer or an injection molding machine. In some cases, additives are added to the material of the frame 14 and/or posts 22*a*, 22*b*. Additives can include, for example, bacteria and/or odor neutralizers, silver ions, and other additives or combinations of additives. One method of manufacturing an embodiment of the urinal screen 10 can include providing plastic or EVA material, which may have a melting point of not greater than 250° F., loading the plastic or EVA with at least 15% to 75%, 15% to 50%, and/or 15% to 35% by weight of fragrance material to produce a fragranced plastic or EVA, loading the fragrance at a stage conducted at temperatures such that the fragranced plastic or EVA is from at least 15% by weight fragrance upon completion of the loading stage, and molding the fragranced plastic or EVA into a urinal screen, sized and shaped to be disposed in a urinal, forming openings 18 in the frame 14, and forming posts 22*a*, 22*b* extending from the frame 14.

The openings 18 can have various shapes, including, but not limited to, circles, polygons (e.g., triangles, rectangles, pentagons, hexagons, etc.), ellipses, and/or some combination thereof. In some embodiments, each of the openings 18 has a substantially identical shape. In some embodiments, one or more of the openings 18 has a different shape from one or more of the other openings.

The openings 18 can occupy a large percentage of the overall surface area of the frame 14 as viewed in FIG. 2. As used herein, the area occupied by an opening 18 is the area through which a surface on which the screen 10 is set can be viewed, from a perspective perpendicular to that surface. The borders of the openings 18 can be defined by the portions of the frame 14 that form the smallest window through which the surface on which the screen 10 is set can be viewed. These portions of the frame 14 can be positioned halfway between the first set of posts 22*a* and the second set of posts 22*b*, as measured perpendicular to a flat surface on which the screen 14 is set. In some embodiments, the borders of the openings 18 are closer to one side of the frame 14 than the other. The openings 18 can occupy more than 1/8, more than 2/9, more than 1/3, more than 1/4, more than 3/8, more than 1/2, more than 5/8, more than 2/3, and/or more than 3/4 of the overall surface area of the frame 14 as viewed in FIG. 2. Utilizing a large number of openings 18 can reduce the overall weight of the urinal screen 10.

Figure 3:
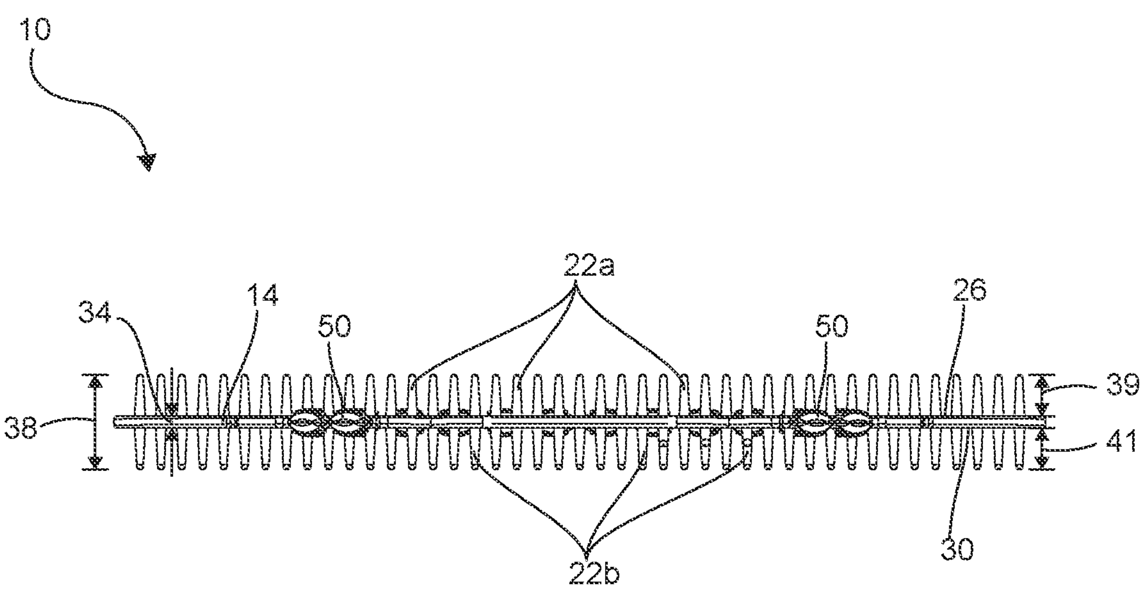
FIG. 3 is a front plan view of the urinal screen of FIG. 1.

As illustrated in FIG. 3, a top side or surface (e.g., the first surface 26) of the frame 14 can lie on a first plane when the urinal screen 10 is set on a flat surface. As used herein, the first surface 26 is defined as the plane upon which a planar object would lie if set upon the frame 14 when all of the protrusions 22*a* are removed and the screen 10 is set upon a flat surface with the protrusions 22*b* directed toward the flat surface. Preferably, the first surface 26 would be parallel to a flat surface upon which the screen 10 is set. In some cases, a bottom surface (e.g., the second surface 30) of the frame 14 can lie on a second plane when the urinal screen is set on a flat surface. As used herein, the second surface 30 is defined as the plane upon which a planar object would lie if set upon the frame 14 when all of the protrusions 22*b* are removed and the screen 10 is set upon a flat surface with the protrusions 22*a* directed toward the flat surface. Preferably, the second surface 30 would be parallel to a flat surface upon which the screen 10 is set. In some embodiments, a maximum cross-sectional area of the frame 14 (e.g., the area not occupied by openings 18), as measured parallel to the first surface 26 is less than 1/2, less than 1/4, less than 1/5, less than 1/6, less than 1/7, less than 1/8, less than 1/9, less than 1/10, less than 1/12, less than 1/15, and/or less than 1/20 of the area defined by the outer perimeter of the frame as measured in the plane. Many variations are possible.

Figure 4:
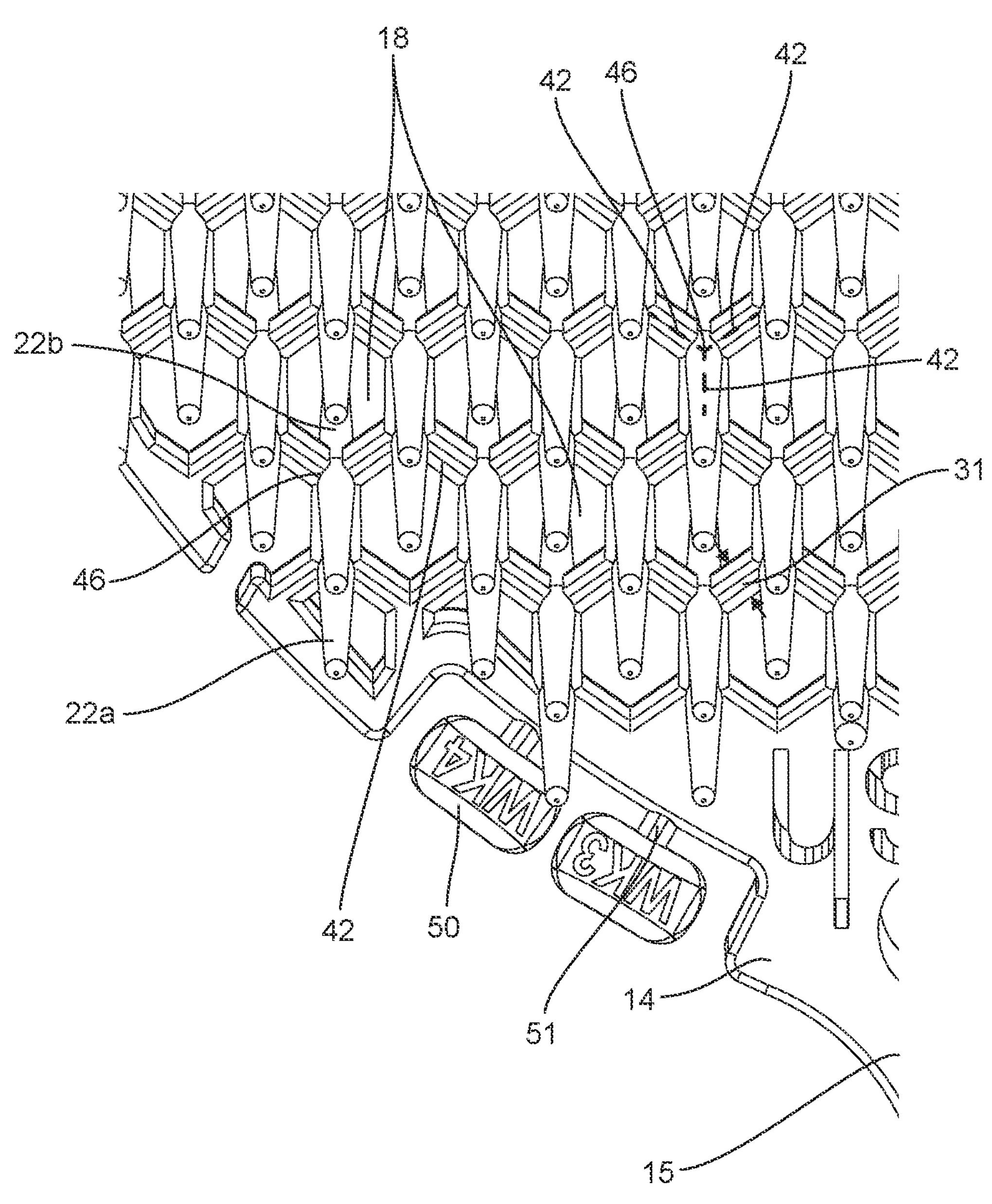
FIG. 4 is a close up top plan view of the urinal screen of FIG. 1.

As illustrated in FIG. 4, one or more of the openings 18 (e.g., cells) can be defined at least partially by a perimeter structure which includes a plurality of sides (e.g., braces) 42 and corners 46. The corners 46 are positioned at the intersection between the sides 42. For example, at an intersection between three sides 42, as illustrated in FIG. 4, the corner 46 is defined as the point at which all three sides 42 meet. In some cases, all or a portion of the frame 14 forms a tessellation of openings 18 wherein a plurality of the sides 42 of the openings 18 are shared between two or more openings 18. In some embodiments, each of the openings 18 shares at least one side and at least one corner with another opening.

In some cases, the sides 42 and/or corners 46 of the openings 18 have contoured (e.g., convex) upper and/or lower surfaces (for example, surfaces 44*a* and 44*b*, discussed below). The contoured surfaces of the sides 42 and corners 46 can deflect fluid (e.g., urine) to reduce splash in the urinal, toilet, or other environment in which the urinal screen 10 is installed.

In some embodiments, portions of the frame 14 include one or more solid or closed portions between or surrounding the openings 18. For example, the frame 14 can include one or more solid cells 52 positioned between and/or adjacent the openings 18 of the frame 14. The solid cells can provide a surface area on which various letters, numbers, symbols, trademarks, and/or other visual features may be placed. For example, advertisements, installation instructions, date features, expiration dates, and/or other features may be included on the solid cells 52. In some embodiments, the frame 14 includes one or more intermediate solid cells 50 and/or large solid cells 15 for placement of larger/more complex visual features. For example, the intermediate solid cells 50 can occupy an area greater than or equal to 2, 3, 4, 5, and/or 6 openings 18. In some embodiments, the large solid cell 15 can occupy an area greater than or equal to 10 openings 18. Many variations are possible. In some embodiments, the one or more solid or closed portions facilitate easier removal of the screen 10 from a mold. In some cases, utilizing solid portions increases an amount of fragrance that can be embedded, coated, injected, or otherwise associated with the screen 10. One or more of the solid cells 50, 52, 15 may be removable from the frame 14. For example, one or more of the solid cells may be attached to the frame via a neck 51 (FIG. 4) or other weakened portion configured to break when the solid cell is pulled, bent, and/or twisted with respect to the frame 14. Removal of a solid cell (e.g. one or more of the solid cells 50, 52) can indicate the date upon which the screen was installed and/or the date by which the screen 10 is scheduled to be replaced. Examples of removable tabs and/or cells are illustrated and described in U.S. Pat. No. 9,243,394, issued Jan. 26, 2016 and titled REPLACEABLE RESTROOM URINAL ASSEMBLIES, INCLUDING URINAL SCREENS, the entire disclosure of which is hereby incorporated by reference herein and made part of the present disclosure.

In some embodiments, the posts 22*a* and/or 22*b* extend from the corners 46 of the frame forming openings 18. In some embodiments, one or more of the posts 22*a*, 22*b* extend from the sides 42 (e.g., the midpoints of the sides 42) of the portions of the frame 14 forming the openings 18 of the frame 14. In some embodiments, posts 22*a*, 22*b* extend from both the portions of the fame forming the corners 46 and the portions of the frame forming the sides 42 between the corners or from some combination thereof. In some embodiments, posts 22*a*, 22*b* extend from the portions of the frame forming the corners 46 of the openings 18 on one side of the frame 14 (e.g., the first side 26) and from the portions of the frame forming the sides 42 of the openings 18 on the other side of the frame 14 (e.g., the second side 30). In some embodiments, 2, 3, 4, 5, or 6 posts extend from the portions of the frame forming the sides 42 (including the corners) of the openings. In some embodiments, at least 2, at least 3, at least 4, at least 5, or at least 6 posts extend from the portions of the frame forming the sides 42 (including the corners) of the openings.

In some embodiments, as illustrated in FIG. 4, one or more of the posts 22*a*, 22*b* may extend over or under an opening 18 such that, when the urinal screen is viewed from a direction normal to the top surface of the frame 14 (for example, the direction of the view of FIG. 4) the one or more of the posts 22*a*, 22*b* at least partially obstructs a view through the openings 18. Such a configuration may be desirable, for example, because it can help to reduce splashing of urine that is passing through the urinal screen and/or it can help to catch hair or other debris that falls into the urinal.

As illustrated in FIG. 4, a majority of the openings 18 are positioned such that six of the upper posts 22*a* are positioned surrounding the opening 18 and/or are positioned such that six of the upper posts 22*a* extend from the perimeter structure that at least partially defines the opening 18. In this embodiment, the six posts 22*a* extend from corners of the perimeter structure, but other embodiments may have the posts positioned at different portions of the perimeter structure (such as the sides or braces). Although not visible in FIG. 4, desirably the other side of the urinal screen comprises a similar structure, with six of the posts 22*b* extending from the perimeter structure of a majority of the openings 18. Although this embodiment desirably comprises six posts surrounding an opening, other embodiments may have more or less posts surrounding an opening, such as 3, 4, 5, 6, 7, 8, or more posts surrounding an opening.

In some embodiments, the plurality of openings 18 comprise outer openings and inner openings. The outer openings are defined as (1) openings that are at least partially defined by a perimeter structure that also at least partially defines an outer perimeter of the urinal screen, (2) openings that are positioned such that a distance from the outer perimeter of the urinal screen to a closest point of the opening is less than a width or diameter of the opening, or (3) openings that are positioned such that a distance from the outer perimeter of the urinal screen to a closest point of the opening is less than ⅕ of the largest linear dimension, measured parallel to the top or bottom surface of the frame 14, from one point of the outer perimeter to another point of the outer perimeter. For example, if a urinal screen comprises a circular outer perimeter, the largest linear dimension would be the diameter of the circular outer perimeter. As another example, if a urinal screen comprises a hexagonal outer perimeter, the largest linear dimension would be the distance between two opposite vertices. As another example, for the urinal screen 10 shown in FIG. 2, the largest linear dimension would be measured from a point of the outer perimeter formed by the large solid cell 15 to a point of the outer perimeter opposite the large solid cell 15. The inner openings are defined as all openings that are not outer openings. In some embodiments, a majority of the inner openings 18 are positioned such that a plurality of posts extend from the perimeter structure that at least partially defines the openings 18. Although this embodiment comprises six upper posts 22*a* and six lower posts 22*b* extending from the perimeter structure of a majority of the inner openings 18, other embodiments may have more or fewer posts extending from the perimeter structure. For example, some embodiments may have at least two posts 22*a* extending from the perimeter structure, at least three posts 22*a* extending from the perimeter structure, at least four posts 22*a* extending from the perimeter structure, at least five posts 22*a* extending from the perimeter structure, or the like.

With further reference to FIG. 4, in this embodiment, for a majority of the inner openings 18, six posts 22*a* extend from the perimeter structure that at least partially defines the opening 18, but only one of those six posts 22*a* has a second and that extends over the opening 18 such that a view of the opening 18 is at least partially obstructed when viewed normal to the surface of the frame 14. Further, one or more of the posts 22*a* may extend outside of the perimeter structure when viewed normal to the surface of the frame 14. In other embodiments, more than one post may have a second end that extends at least partially over the opening 18 such that the opening 18 is obstructed when viewed normal to the surface of the frame 14.

Figure 5:
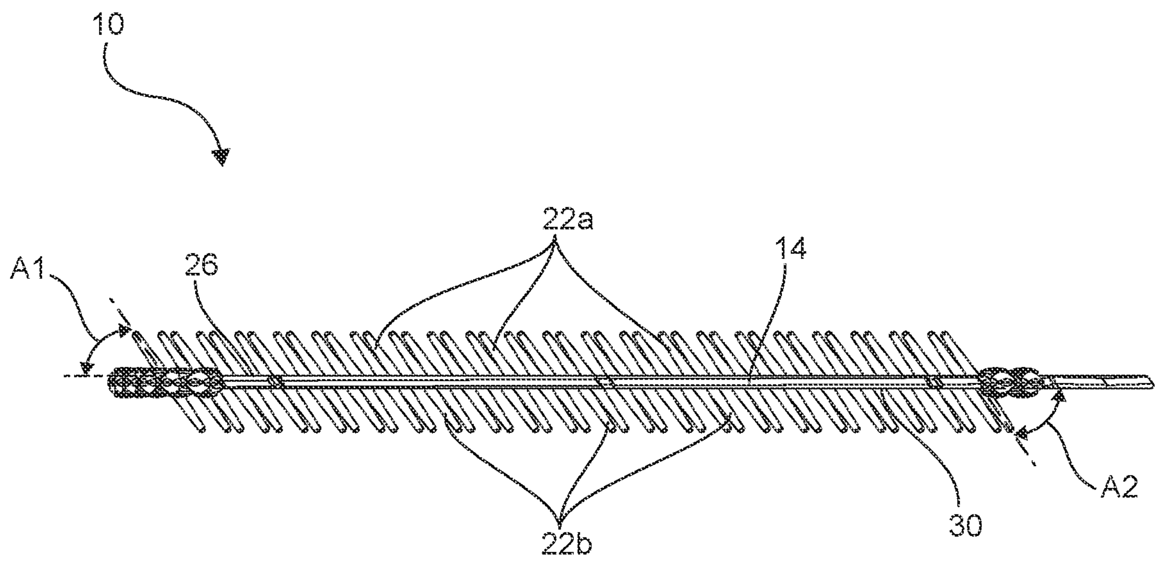
FIG. 5 is a side plan view of the urinal screen of FIG. 1.

As illustrated in FIG. 5, the posts 22*a* can extend from the first surface 26 of the frame 14. In some embodiments, posts extend from both the first surface 26 of the frame 14 and the second surface 30 of the frame 14. For example, a first plurality of posts 22*a* can extend from the first surface 26 of the frame 14 and a second plurality of posts 22*b* can extend from the second surface 30 of the frame 14. Each of the posts in the first plurality of posts 22*a* can be substantially identical to the each of the posts in the second plurality of posts 22*b*. For example, each of the posts can have the same height, width and/or overall shape.

In some embodiments, at least half, at least ¾, at least ⅕, at least ⅔, at least ⅓, at least 9/10, at least ⅘ and/or at least 1/10 of the first plurality of posts 22*a* have a same size and shape as at least half, at least ¾, at least ⅕, at least ⅔, at least ⅓, at least 9/10, at least ⅘ and/or at least 1/10 of the second plurality of posts 22*b*. In some embodiments, one or more of the posts in the first plurality of posts 22*a* has a different shape and/or height than one or more of the posts in the second plurality of posts 22*b*. In some embodiments, the first plurality of posts 22*a* and/or the second plurality of posts 22*b* have a plurality of heights. For example, a percentage (e.g., 25%, 50%, 75% or some other percentage) of the posts 22 can be shorter than the remaining posts as measured from the first or second surfaces 26, 30 of the frame 14. In some embodiments, at least ⅘, at least ⅗, at least ½, and/or at least ¼ of the posts 22 have a height differing from the remaining posts 22. In some embodiments, one or more of the posts 22 is at least ⅕, at least 1/10, at least ⅛, at least ¼, and/or at least ⅓ shorter than one or more of the other posts 22. In some cases, each post is at least ⅕ shorter, at least 1/10 shorter, at least ⅛ shorter, at least ¼ shorter, at least ⅓ shorter, at least ½ taller, at least ¼ taller, at least ⅛ taller, at least 1/10 taller, and/or at least 1/16 taller than at least one of the 3 closest posts 22, at least one of the 5 closest posts 22, at least one of the 7 closest posts 22, at least one of the 9 closest posts 22, at least one of the 10 closest posts 22, at least one of the 12 closest posts 22, and/or at least one of the 15 closest posts 22. In some embodiments, shortening a percentage of the posts 22 can reduce the likelihood that debris is caught in the urinal screen 10. In some embodiments, a total number of the first plurality of posts 22*a* is equal to a total number of the second plurality of posts 22*b*. In some embodiments, the total number of the first plurality of posts 22*a* is within 5%, 10%, 15%, 20%, 25%, 30%, 35%, 40%, 45%, or 50% of the total number of the second plurality of posts 22*b*.

In some embodiments, one or more of the posts 22*a*, 22*b* extends from the frame 14 at a non-perpendicular angle. For example, as illustrated in FIG. 5, one or more of the posts 22*a* can extend from the first side 26 of the frame 14 at an angle A1. As will be appreciated by one of skill in the art, the angles A1 and A2 (see below), as used herein, are used to refer to the acute or right angle between the post 22*a*, 22*b* and the side 26, 30 of the frame 14. As such, the values of the angles A1, A2 are always less than or equal to 90°. The angle A1 can be less than or equal to 90°, less than or equal to 80°, less than or equal to 75°, less than or equal to 65°, less than or equal to 55°, less than or equal to 45°, less than or equal to 40°, and/or less than or equal to 30°. In some embodiments, the angle A1 is between 5° and 85°, between 15° and 75°, between 25° and 65°, between 40° and 70°, between 35° and 75°, between 45° and 65°, between 50° and 65°, and/or between 55° and 80°. In some embodiments, the angle A1 is approximately 55°. The value of angle A2 between one or more of the posts 22*b* and the second side 30 of the frame 14 can be greater than or less than the value of angle A1. Preferably, the value of angle A2 is approximately equal to the value of angle A1. In some embodiments, one or more of the posts 22*a* and/or 22*b* extends outside of a perimeter of the frame 14 when viewed from perpendicular to the first or second sides 26, 30 of the frame 14. In some embodiments, one or more of the posts 22*a*, and/or 22*b* is non-parallel to one or more of the other posts 22*a*, 22*b*. For example, one or more posts 22*a* and/or 22*b* can extend at a same angle with respect to the frame, but in a different direction. One such pattern could include posts 22*a*, 22*b* that extend from the frame 14 at an angle and toward the perimeter of the frame 14. In some embodiments, one or more posts 22*a*, 22*b* extend from the frame 14 at an angle and toward a center of the frame 14. In some embodiments, at least ¼, at least ⅓, at least ½, at least ⅔, at least ¾, and/or at least 9/10 of the posts 22*a*, 22*b* are parallel to each other.

Orienting the protrusions 22*a*, 22*b* at non-perpendicular angles with respect to the surfaces 26, 30 can increase the area of the frame 14 over which the protrusions 22*a*, 22*b* overlap or cover. This can reduce the amount of urine that directly impacts the frame 14. This can be especially beneficial in urinals that have bottom surface/drains positioned close to the ground, as the angle of urine will be steeper/closer to vertical. The angled orientation of the protrusions 22*a*, 22*b* can allow for fewer protrusions to cover the same or more area of the frame 14 than embodiments wherein the protrusions extend perpendicularly from the frame 14. Using fewer protrusions can reduce the weight and material costs of the screen 10.

Although FIG. 5 illustrates the longitudinal axes of the top and bottom posts 22*a*, 22*b* being parallel to one another, in other embodiments, the top posts 22*a* may not be parallel to the bottom posts 22*b*. For example, in any embodiment where A2 is not equal to A1, the longitudinal axes of the top and bottom posts 22*a*, 22*b* will not be parallel to one another. In some embodiments, it can be desirable for the value of the angles A1 and A2 to be equal, but for the posts 22*a* to not be parallel to the posts 22*b*. For example, the angles A1 and A2 may be congruent, but the longitudinal axes of the bottom posts 22*b* may not be parallel to the longitudinal axis of the top posts 22*a*. In some embodiments where the angles A1 and A2 are congruent, the bottom posts 22*b* may be a mirror image of the top posts 22*a*, as viewed in Figure Stated another way, in the current embodiment shown in FIG. 5, the bottom posts 22*b* are pointing toward the right side of the view and oriented at angle A2, while the top posts 22*a* are pointing toward the left side of the view and oriented at angle A1. But, in another embodiment, the bottom posts 22*b* may be configured such that they point toward the left side of the view, while still being oriented at the same value as angle A2. If angle A2 is congruent with angle A1, then the bottom posts 22*b* would be a mirror image of the top posts 22*a*, mirrored across a central longitudinal plane of the frame 14. FIG. 5B illustrates a close up cross-sectional side plan view of such a configuration.

The frame 14 can have a generally planar or flat shape. Additionally, the distal ends of the posts 22*a*, 22*b* can be formed such that the frame of the urinal screen 10 is positioned parallel or within 5 degrees of parallel to a flat surface on which the urinal screen is supported or the opposing face of the urinal or toilet on which the urinal screen is supported. In some embodiments, the frame 14 is curved or otherwise shaped in non-planar fashion. For example, the frame 14 can be molded in a non-planar shape to match the contours of a urinal or toilet.

As illustrated in FIG. 3, the frame 14 can have a frame thickness 34 (e.g., a distance between the first and second surfaces 26, 30 of the frame 14). The frame thickness 34 can be uniform across the entire frame 14 or can vary in certain portions of the frame 14. An overall thickness 38 of the urinal screen 10 can be measured from a tip of the tallest post 22*a* extending from the first surface 26 of the frame 14 to a tip of the tallest post 22*b* extending from the second surface 30 of the fame 14 as measured perpendicularly from the first and second surfaces 26, 30. In some cases, wherein the frame 14 is not planar/flat, the overall thickness 38 of the urinal screen 10 can be determined via the tips of the posts 22*a*, 22*b* as measured perpendicularly to a tangent plane of the first surface 26 of the frame 14 at a point on the frame 14 where the thicknesses 34, 38 are being measured.

In some embodiments, the frame thickness 34 at a given position on the frame 14 is less than or equal to ½ of the overall screen thickness 38 as measured perpendicularly to the first surface 26 of the frame 14 at the given position. In some embodiments, the frame thickness 34 is less than or equal to ⅔, less than or equal to ⅝, less than or equal to ⅜, less than or equal to ⅓, less than or equal to ¼, less than or equal to 2/9, less than or equal to ⅛, less than or equal to 1/10, less than or equal to 1/16, and/or less than or equal to 1/32 of the overall screen thickness 38. In some embodiments, the maximum frame thickness 34 is less than or equal to ½ of the maximum screen thickness 38 as measured perpendicularly to the first surface 26 of the frame 14. In some embodiments, the maximum frame thickness 34 is less than or equal to ⅔, less than or equal to ⅝, less than or equal to ⅜, less than or equal to ⅓, less than or equal to ¼, less than or equal to 2/9, less than or equal to ⅛, less than or equal to 1/10, less than or equal to 1/16, and/or less than or equal to 1/32 of the maximum overall screen thickness 38. Use of a thin frame 14 can reduce the overall weight of the urinal screen 10.

The height 39 of the first plurality of posts 22*a*, as measured perpendicular to the first surface 26 of the frame 14, can be approximately equal to the height 41 of the second plurality of posts 22*b*, as measured perpendicular to the second surface 30 of the frame 14. In some embodiments, the height 39 of the first plurality of posts 22*a*, as measured perpendicular to the first surface 26 of the frame 14, is less than or greater than the height 41 of the second plurality of posts 22*b*, as measured perpendicular to the second surface 30 of the frame 14. In some embodiments, the height of one or more posts of the first plurality of posts 22*a* is greater than height of one or more of the other posts of the first plurality of posts, as measured perpendicular to the first surface 26 of the frame. In some embodiments, the height of one or more posts of the second plurality of posts 22*b* is greater than height of one or more of the other posts of the second plurality of posts, as measured perpendicular to the second surface 30 of the frame. The heights 39, 41 of the posts 22*a*, 22*b* can be affected by the angles A1, A2 at which the posts 22*a*, 22*b* extend from the frame 14 (FIG. 5). For example, one or more posts 22*a*, 22*b* may have a greater height as measured perpendicular to the surfaces of the frame 14 while having the same length (e.g., length of the post measured parallel to the direction of extension of the post) when those posts extend from the frame 14 at a greater angle A1, A2.

Figure 5A:
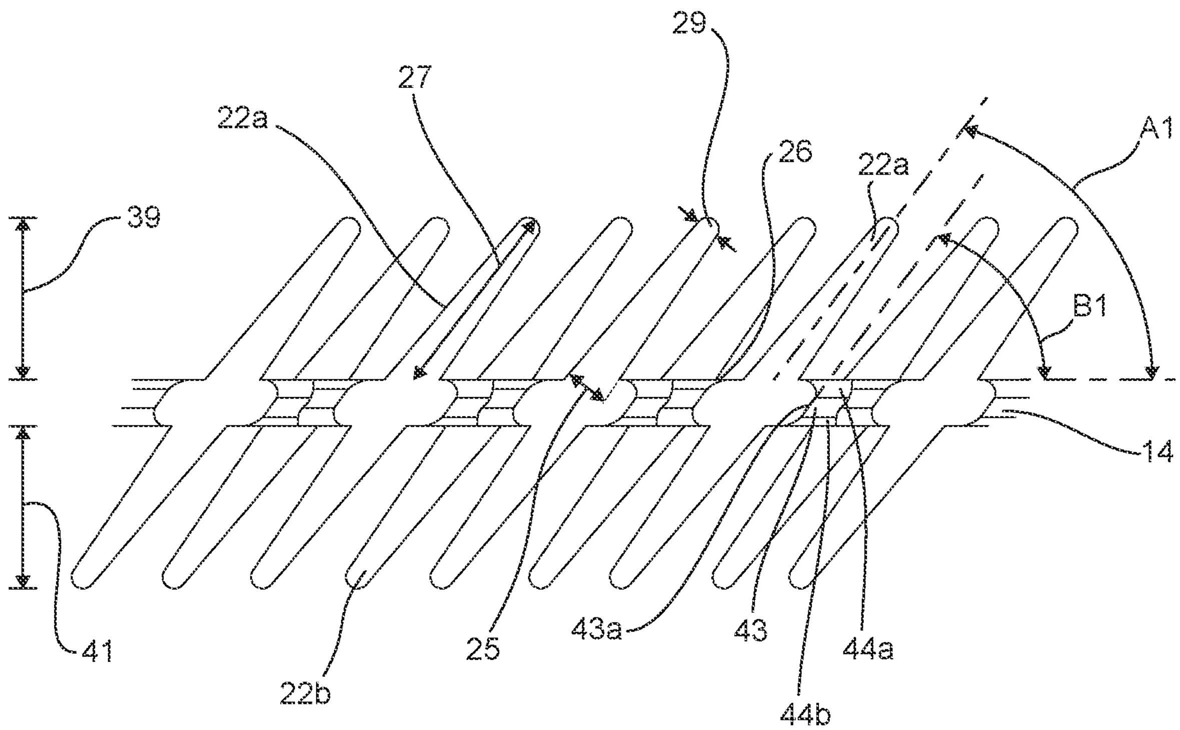
FIG. 5A is a close up cross-sectional side plan view of the urinal screen of FIG. 1.
Figure 5B:
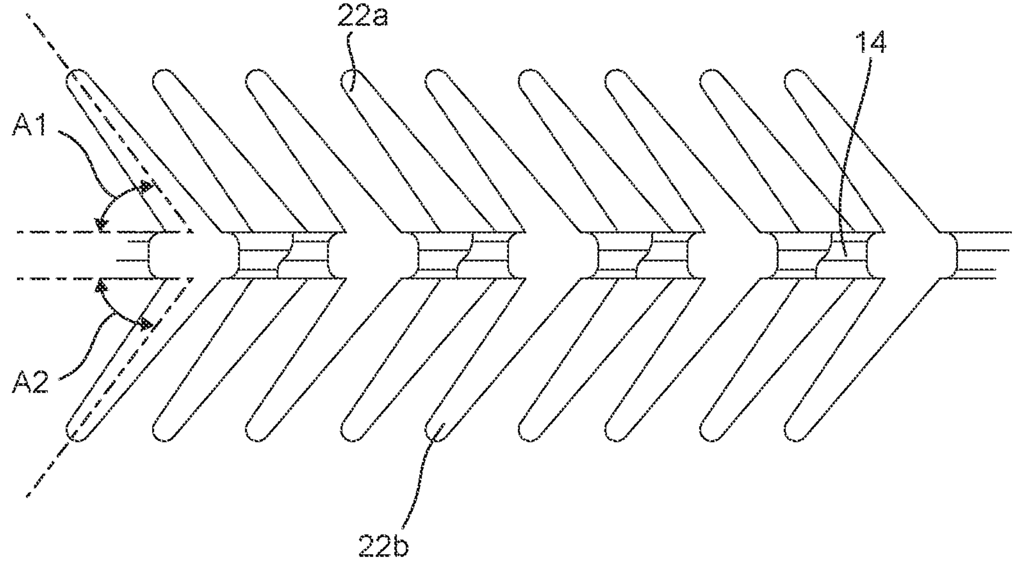
FIG. 5B is a close up cross-sectional side plan view of another urinal screen.

FIG. 5A is a close up cross-sectional side plan view of the urinal screen of FIGS. 1-5. The cross-section is taken through a plane that is perpendicular to the surface 26 of the urinal screen 10, and aligned with a longitudinal axis of a post 22*a* (for example, the longitudinal axis that defines angle A1). For clarity, various dimensions are illustrated with respect to the upper posts 22*a*, and are not repeated for the lower posts 22*b*. The values and ratios for any dimensions illustrated for the upper posts 22*a* may also apply to the lower posts 22*b*, however. As illustrated in FIG. 5A, the posts 22*a*, 22*b* can have a length 27 measured along a longitudinal axis of the post from a distal tip of the post to a point where the longitudinal axis intersects the surface that the post extends from (for example, surface 26 for the upper posts 22*a*). The posts 22*a*, 22*b* can also have a base width 25 as measured perpendicular to the length 27 of the posts at the interface between the posts and the frame 14. The posts 22*a*, 22*b* can have a tip width 29 measured perpendicular to the length 27 of the posts at a point at the tip of the posts. For example, as illustrated, the tip width 29 can be measured at the point along the posts where the shape of the posts transitions from a frustoconical or cylindrical shape to a rounded tip. The ratio of the tip width 29 to the base width 25 can be between 1:2 and 2:3, between 1:4 and 2:5, between 3:16 and 5:16, between 1:8 and 3:8, between 1:9 and 3:9, between 1:4 and 1:2, between 1:5 and 1:2, between 3:5 and 7:8, between 1:5 and 9:10, and/or between 5:8 and 1:1. In some embodiments, the ratio between the tip width 29 and the base width 25 is approximately 3:8. In some embodiments, the ratio between the tip width 29 and the base width 25 is approximately 1:4. In some embodiments, the ratio between the tip width 29 and the base width 25 is approximately 2:9. In some embodiments, a ratio of the base width 25 to the length 27 is approximately 1:4. In some embodiments, a ratio of the base width 25 to the length 27 is approximately 1:5. In some embodiments, a ratio of the base width 25 to the length 27 is between 1:6 and 1:3. In some embodiments, a ratio of the base width 25 to the length 27 is between 1:5 and 1:4. In some embodiments, the length 27 of the posts can be greater than a height of the posts measured perpendicular to the frame (for example, height 39 or 41). For example, the length of the posts can be approximately 1.2 times the height of the posts. In some embodiments, the length of the posts can be within a range of 1.1 to 1.3 times the height of the posts. In some embodiments, the length of the posts can be within a range of 1.0 to 1.4 times the height of the posts. In some embodiments, the length of the posts can be at least 1.0, 1.1, 1.2, 1.3, or 1.4 times the height of the posts. It can be desirable in some embodiments to have the length of the posts be greater than the height of the posts, such as to increase a surface area of the posts to enable greater splash dissipation and/or capturing of debris.

Figure 16:
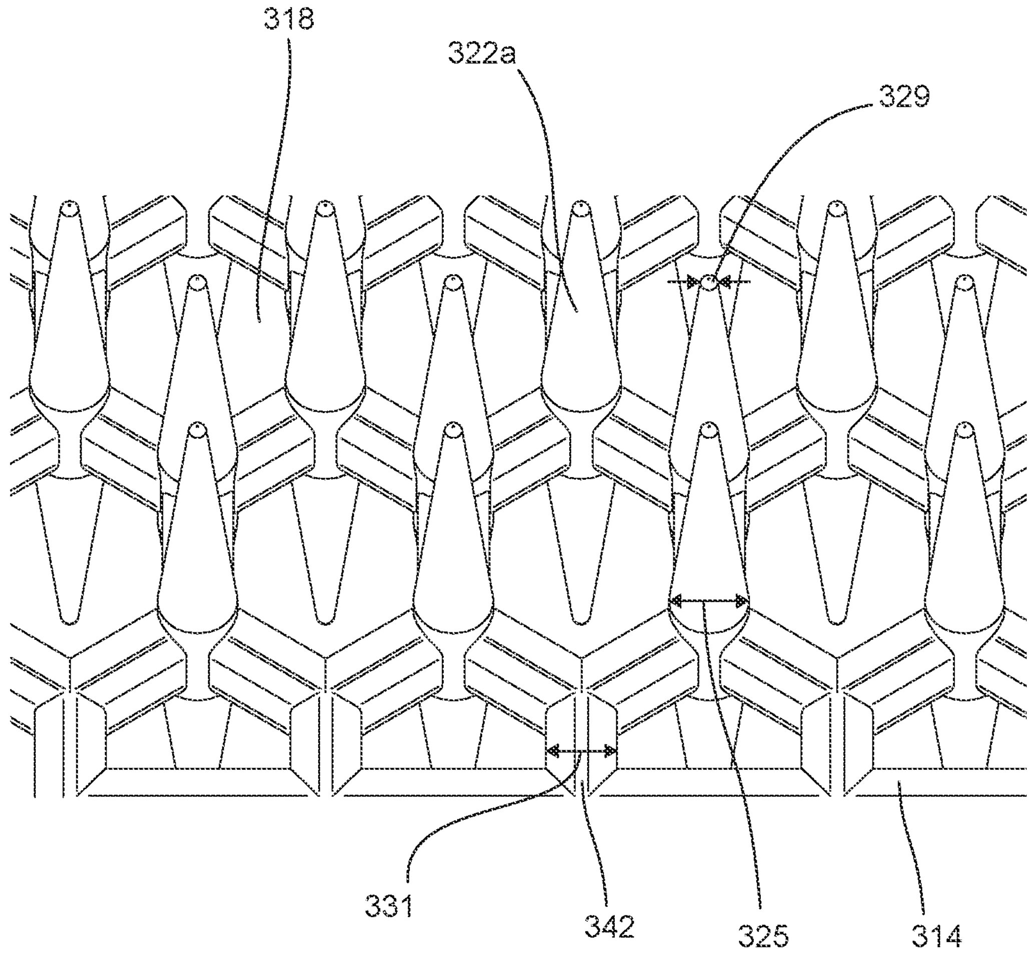
FIG. 16 is a close up top plan view of the urinal screen of FIG. 14.
Figure 17:
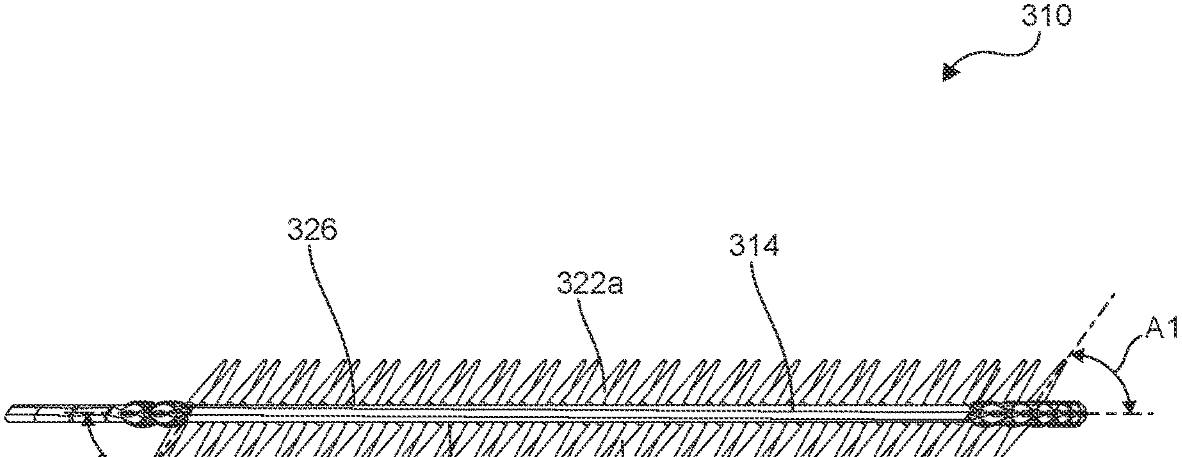
FIG. 17 is a side plan view of the urinal screen of FIG. 14.
Figure 18:
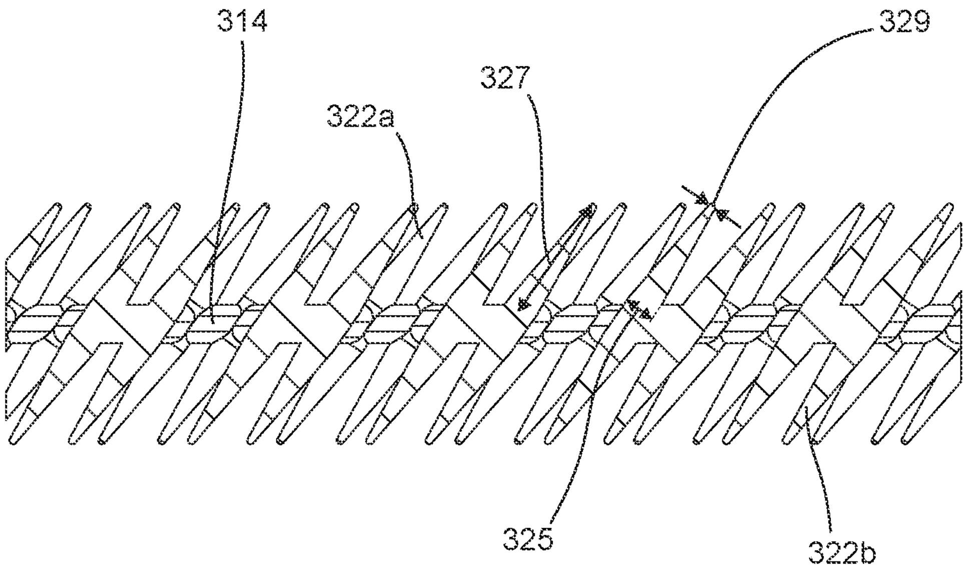
FIG. 18 is a close up cross-sectional view of the urinal screen of FIG. 14, taken along the cut-plane 18-18 of FIG. 15.

In some embodiments, the base width 25 of the posts is less than a width 31 of the sides/braces 42 forming the perimeters of the openings 18 in the frame 14. The width 31 is measured parallel to the first surface 26 of the frame 14. In some embodiments, the base width 25 of the posts is approximately equal to the width 31 of the sides/braces 42. In some embodiments, the base width 25 of the posts is greater than the width 31 of the sides/braces 42 (see, e.g., FIGS. 16 and 18). Thickening the posts (e.g., with respect to the width of the braces 42) can reduce the rate at which embedded fragrance is released from the posts. Slowing the rate of fragrance release can increase the effective life of the urinal screen 10. In some embodiments, the base width 25 of the posts is between 1 mm and 4 mm, between 1.5 mm and 3 mm, between 2 mm and 2.75 mm, between 3 mm and 5 mm, and/or between 1.75 mm and 3.25 mm. In some embodiments, the base width 25 of the posts is approximately 2.5 mm.

In some embodiments, the posts 22*a*, 22*b* have a generally cylindrical or tapered cylindrical shape. Other shapes are also possible. For example, all or a portion of one or more of the posts 22*a*, 22*b* can have an oval cross-section, a polygonal cross-section, and/or a combination of curved and polygonal shaped cross-section.

With continued reference to FIG. 5A, the braces 42 that at least partially define the openings 18 may further comprise a wall 43 and upper and lower contoured portions 44*a*, 44*b*. The wall 43 may desirably be oriented at a non-perpendicular angle with respect to the side 26 of the urinal screen. For example, as shown in FIG. 5A, non-perpendicular angle B1 is defined as the angle of the wall 43 measured at line 43*a* adjacent the post 22*a* at the intersection of the wall 43 with the cross-sectional plane. Although B1 illustrates the angle of line 43*a*, any other portion of the walls 43 may also be oriented at the same angle B1 with respect to the side 26 of the urinal screen. The wall 43 being oriented at a non-perpendicular angle may further help to prevent splashing of urine onto a user of the urinal. The value of angle B1 may be any of the angles or ranges of angles disclosed herein with respect to the angle of the posts, such as angles A1 and A2 as described above. In some embodiments, the angle B1 of the wall 43 is desirably equal to the angle A1 of the post 22*a*. This may, for example, make manufacturing easier and/or cheaper by allowing a mold to be designed that comes together and separates along a direction parallel to the axes of the posts 22*a*, 22*b*. In some embodiments, however, the angle B1 does not have to be equal to angle A1. Unless otherwise stated, when an angle is described herein as being equal to, or the same as, another angle, that means that the value in degrees of both angles is the same, when measured in the same plane and in the same direction with respect to the same reference plane. For example, with reference to FIG. 5A, if angles A1 and B1 are described as being the same as one another or equal to one another, this means that both angles comprise the same value in degrees, as measured in the cross-sectional plane of FIG. 5A, and as measured in a counterclockwise direction from surface 26 (i.e. in the direction from surface 26 that results in an acute angle). Unless otherwise stated, when an angle is described herein as being within a certain percentage of another angle, that means that the value in degrees of one angle is within the given percentage of the value in degrees of the other angle, when measured in the same plane and in the same direction with respect to the same reference plane. For example, if angle B1 is described as being within 15% of angle A1, and angle A1 is 45 degrees, then angle B1 is within a range of 38.25 to 51.75 degrees, with both angles A1 and B1 being measured in the cross-sectional plane of FIG. 5A and being measured in a counterclockwise direction from surface 26 (i.e. in the direction from surface 26 that results in an acute angle). Unless otherwise stated, when an angle is described herein as being congruent to another angle, or as comprising a same value as another angle, that means that the value in degrees of both angles is the same, but the two angles do not have to be measured in the same plane, in the same direction, or with respect to the same reference plane. Unless otherwise stated, when an angle is described herein as being within a certain percentage of being congruent to another angle, or as comprising a value that is within a certain percentage of a value of another angle, that means that the value in degrees of one angle is within the given percentage of the value in degrees of the other angle, but the two angles do not have to be measured in the same plane, in the same direction, or with respect to the same reference plane. In some embodiments, at least 75% of the braces comprise walls that are oriented at a same angle as a post with respect to a surface of the frame. In some embodiments, at least 20%, 30%, 40%, 50%, 60%, 70%, 80%, or 90% of the braces comprise walls that are oriented at a same angle as a post with respect to a surface of the frame. In some embodiments, at least 75% of the braces comprise walls that are oriented at an angle B1 that is within 5% of angle A1. In some embodiments, at least 20%, 30%, 40%, 50%, 60%, 70%, 80%, or 90% of the braces comprise walls that are oriented at an angle B1 that is within 5% of angle A1. In some embodiments, at least 75% of the braces comprise walls that are oriented at an angle B1 that is within 10% of angle A1. In some embodiments, at least 20%, 30%, 40%, 50%, 60%, 70%, 80%, or 90% of the braces comprise walls that are oriented at an angle B1 that is within 10% of angle A1. In some embodiments, at least 75% of the braces comprise walls that are oriented at an angle B1 that is within 15% of angle A1. In some embodiments, at least 20%, 30%, 40%, 50%, 60%, 70%, 80%, or 90% of the braces comprise walls that are oriented at an angle B1 that is within 15% of angle A1. In the embodiment illustrated in FIG. 5A, the upper and lower contoured surfaces 44*a*, 44*b* comprise convex radiused surfaces. These contoured surfaces may help to deflect urine and prevent splashing of urine onto the user of the urinal. In various other embodiments, the upper and lower surfaces 44*a*, 44*b* may be different shapes, may be larger or smaller than as shown, and/or the like. It should be noted that, although this embodiment comprises an angled side wall 43, other embodiments may not comprise an angled side wall, and may comprise a side wall 43 of the opening that is generally perpendicular to a face of the urinal screen. Further, in some embodiments, the upper and lower contoured surfaces 44*a*, 44*b* may come together in the middle without a side wall 43, thus leading to a generally radiused or contoured side of the opening throughout the thickness of the urinal screen frame.

In some embodiments, the urinal screen 10 is configured such that a plurality of posts 22*a*, 22*b* space the frame 14 from the installation surface of a urinal or other fixture onto which the urinal screen 10 is installed. The posts 22*a*, 22*b* space the frame 14 from the installation surface independent from the orientation of the urinal screen 10. For example, the second plurality of posts 22*b* can form a base of the urinal screen 10 and can space the frame 14 from the installation surface when the screen 10 is installed with the second surface 30 of the frame 14 facing the installation surface. On the other hand, the first plurality of posts 22*a* can form a base of the urinal screen 10 and can space the frame 14 from the installation surface when the screen 10 is installed with the first surface 26 of the frame facing the installation surface. In some embodiments, the posts 22*a*, 22*b* space the frame 14 from the installation surface by at least ⅓ of the overall thickness 38 of the urinal screen 10. In some embodiments, the posts 22*a*, 22*b* space the frame 14 from the installation surface by at least ⅛, at least ⅐, at least ⅙, at least ⅕, at least ¼, at least ⅜, and/or by at least 4/9 of the overall thickness 38 of the urinal screen 10.

Spacing the frame 14 from the installation surface can reduce the likelihood that the openings 18 are clogged by debris. In some embodiments, the posts 22*a*, 22*b* positioned between the frame 14 and the installation surface can reduce splashing in the urinal by deflecting urine or other fluids which pass between the frame 14 and the installation surface (e.g., fluid that passes through the openings 18 or around the perimeter of the frame 14).

FIGS. 6-9 illustrate an embodiment of a urinal screen 110 that shares characteristics with the urinal screen 10 illustrated in FIGS. 1-5. For example, the urinal screen 110 has a frame 114 that shares characteristics with the frame 14 of urinal screen 10. Unless otherwise explained below, features of the urinal screen 110 that share the last two numerical digits (e.g., openings 118 and openings 18, and surface 130 and surface 30) with features of the urinal screen 10 share many or all structural and functional characteristics.

Figure 6:
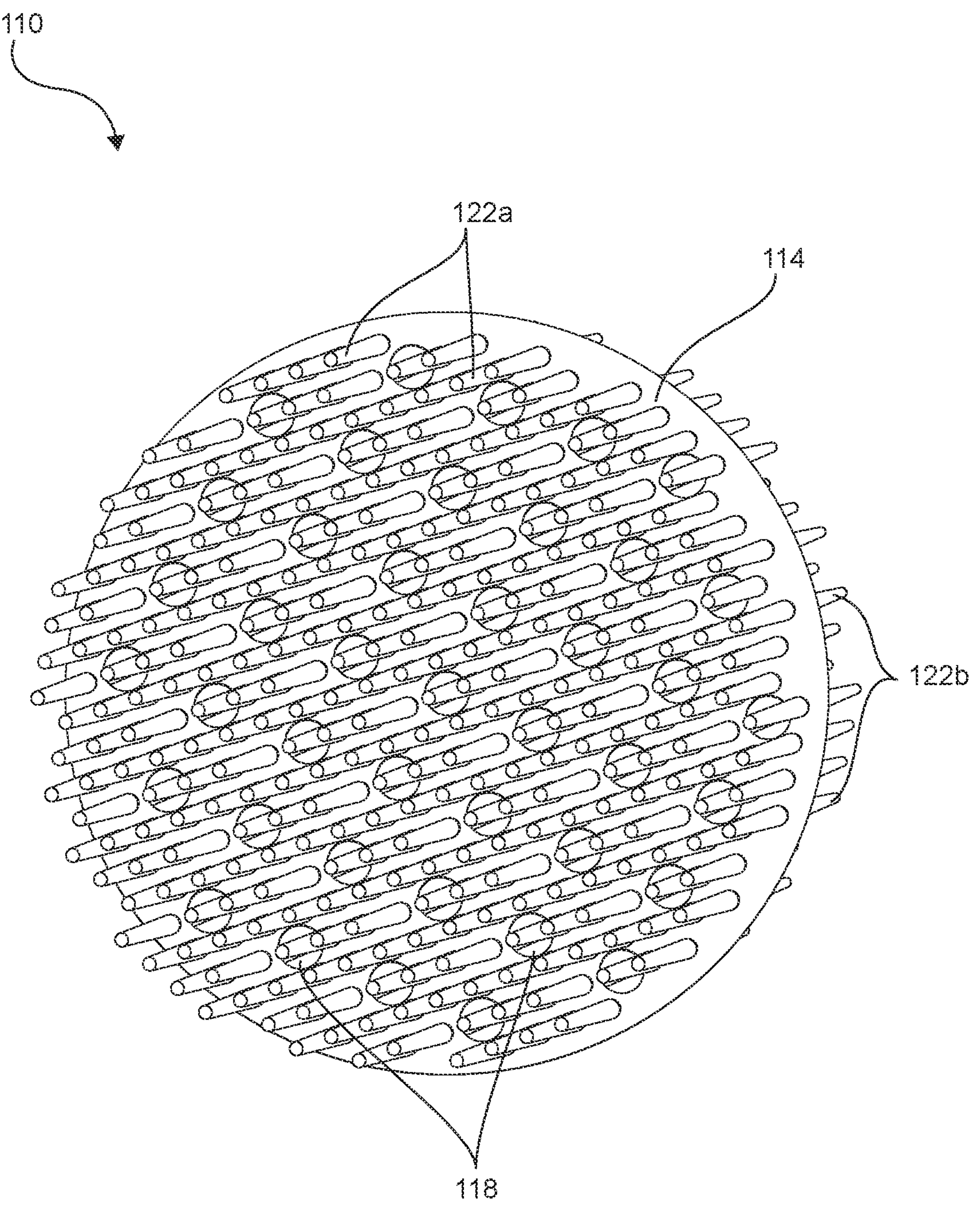
FIG. 6 is a top perspective view of another urinal screen.
Figure 7:
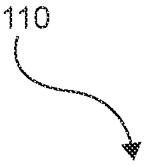
FIG. 7 is a front plan view of the urinal screen of FIG. 6.
Figure 7:
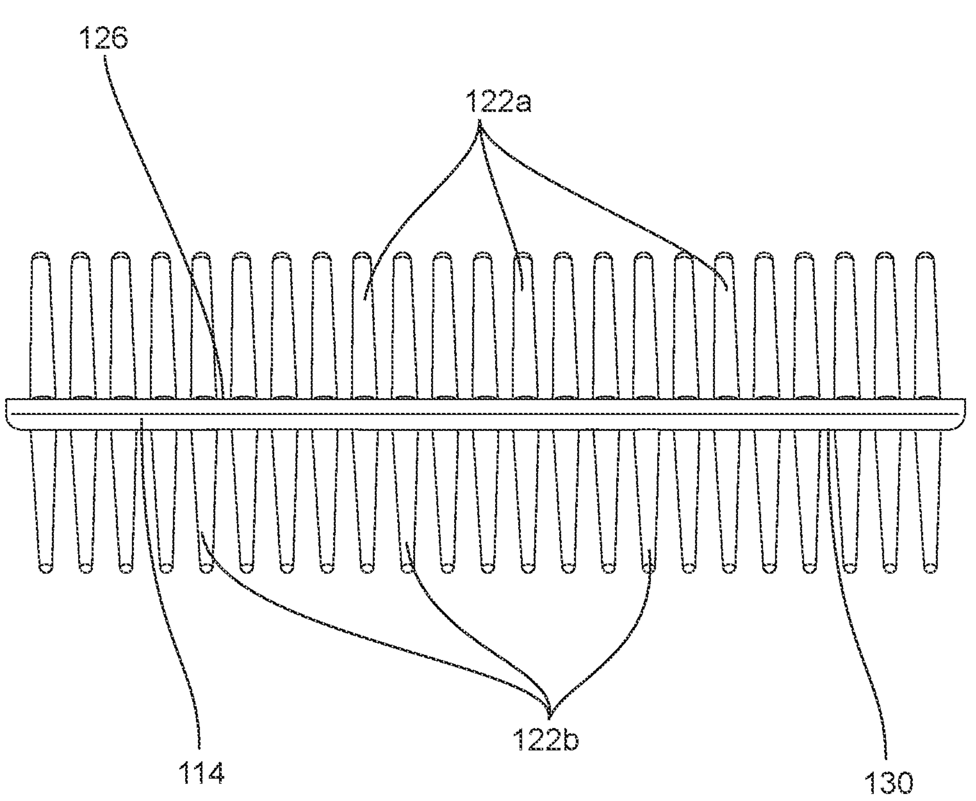
Figure 8:
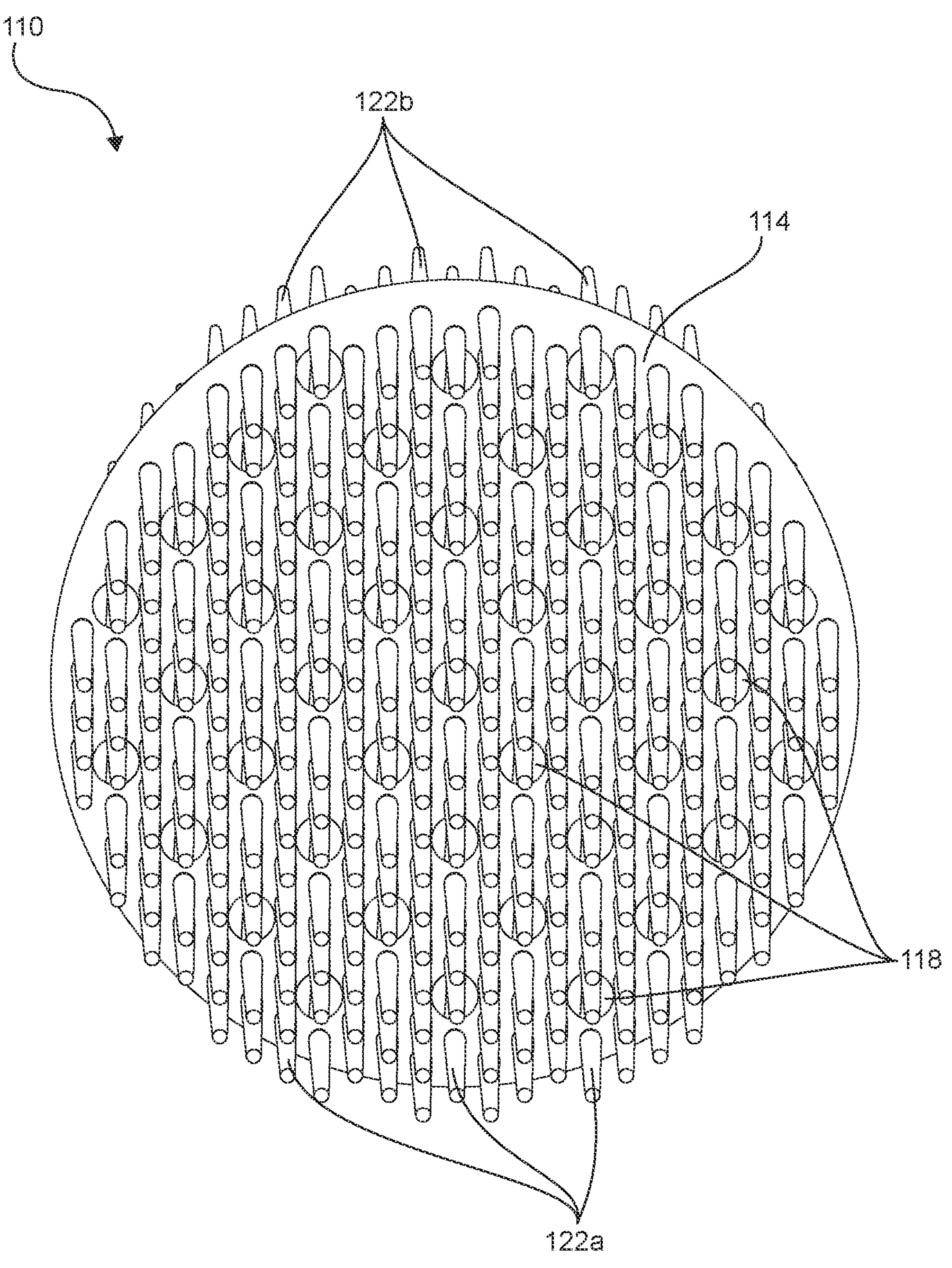
FIG. 8 is a top plan view of the urinal screen of FIG. 6.
Figure 9:
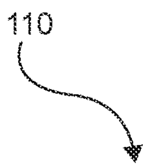
FIG. 9 is a side plan view of the urinal screen of FIG. 6.
Figure 9:
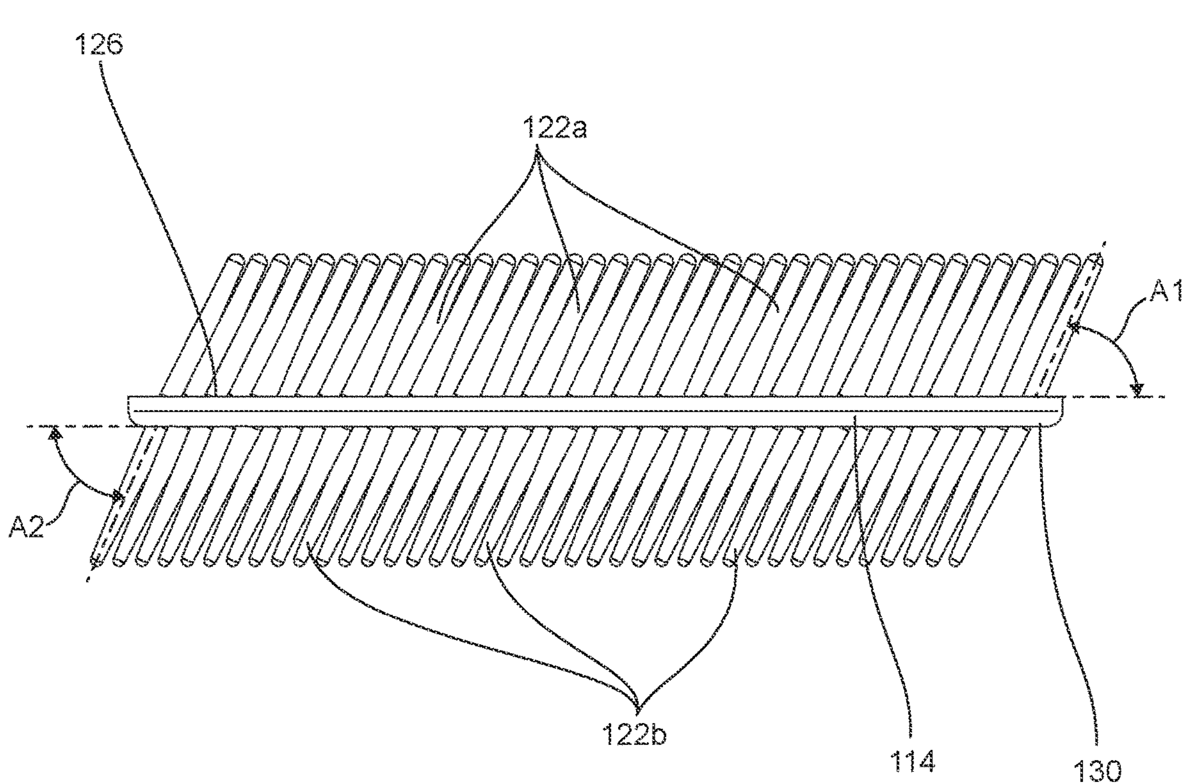
Figure 10:
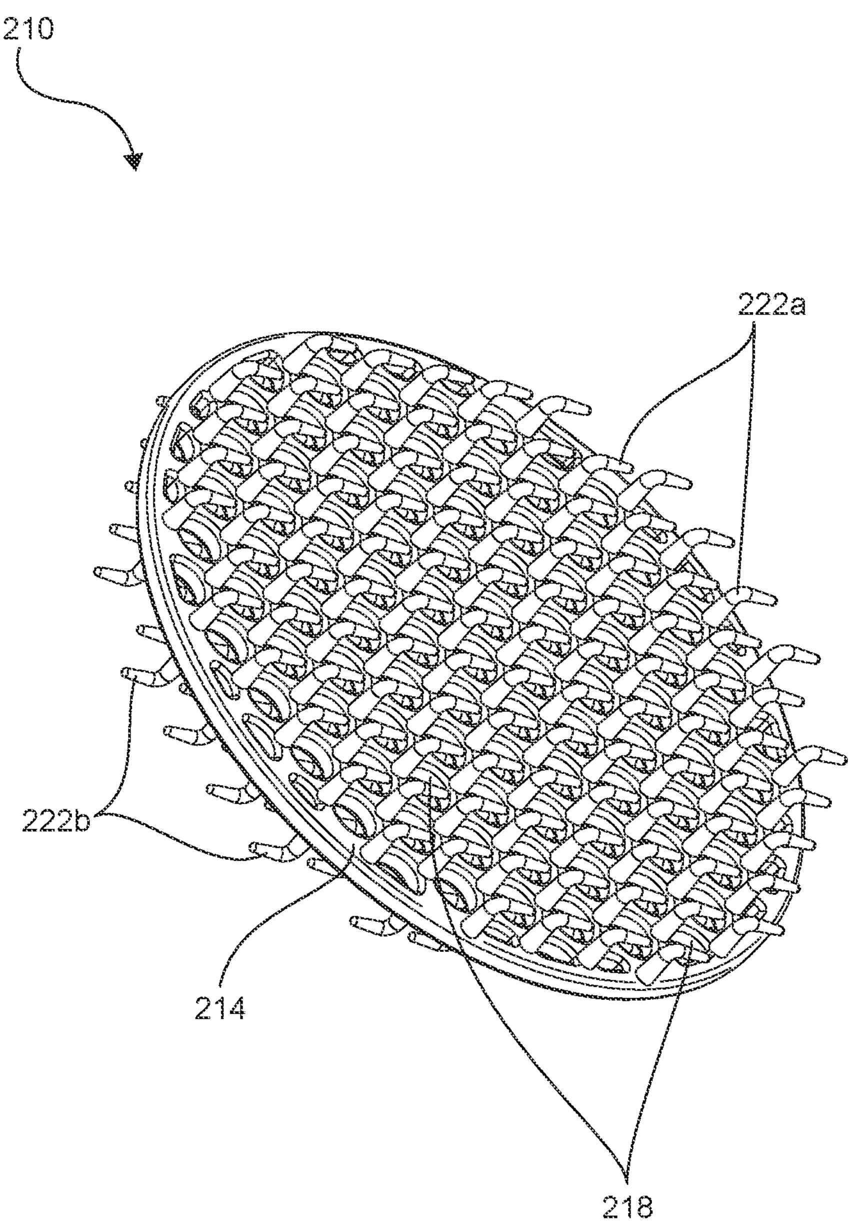
FIG. 10 is a top perspective view of another urinal screen.
Figure 11:
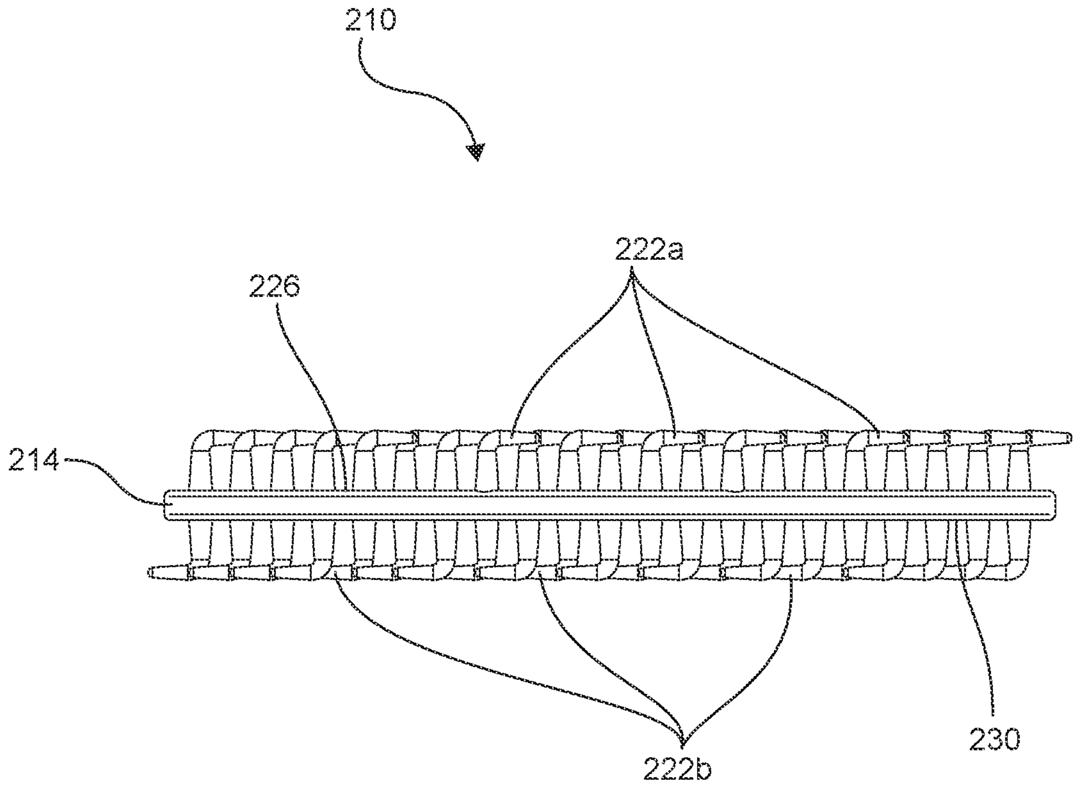
FIG. 11 is a side plan view of the urinal screen of FIG. 10.

As illustrated in FIGS. 6 and 8, the openings 118 of the frame 114 can be spaced from further from each other than the spacing between the openings 18 of the frame 14 describe above. In some embodiments, the openings 118 occupy less than 90%, less than 80%, less than 65%, less than 50%, and/or less than 40% of the area of the frame 114 as observed perpendicular to the first surface 126 of the frame 114.

As illustrated in FIG. 8, one or more of the posts 122*a*, 122*b* can extend beyond the perimeter of the frame 114 as observed perpendicular to the first surface 126 of the frame 114. As illustrated in FIG. 8, the perimeter of the frame 114 can be circular. Extending one or more of the posts 122*a*, 122*b* beyond the perimeter of the frame 114 can increase the area over which the screen 110 can dissipate urine splash.

FIGS. 10-13 illustrate an embodiment of a urinal screen 210 that shares characteristics with the urinal screen 10 illustrated in FIGS. 1-5. For example, the urinal screen 210 has a frame 214 that shares characteristics with the frame 14 of urinal screen 10. Unless otherwise explained below, features of the urinal screen 210 that share the last two numerical digits (e.g., openings 218 and openings 18) with features of the urinal screen 10 share many or all structural and functional characteristics.

Figure 13:
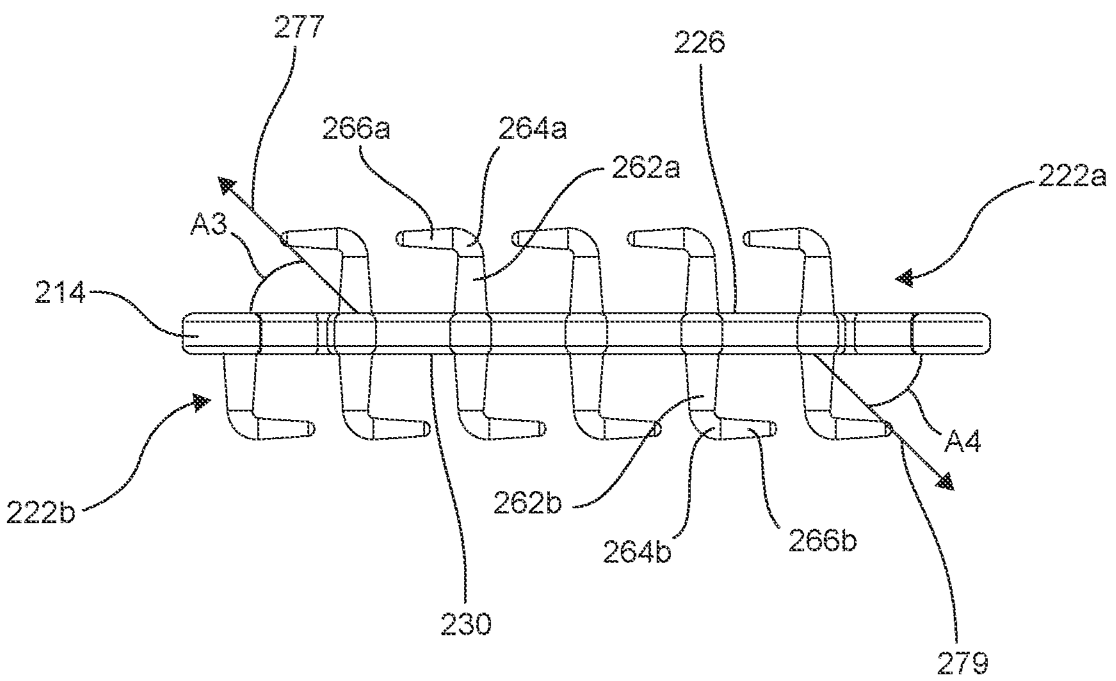
FIG. 13 is a close up side plan view of the urinal screen of FIG. 10.
Figure 14:
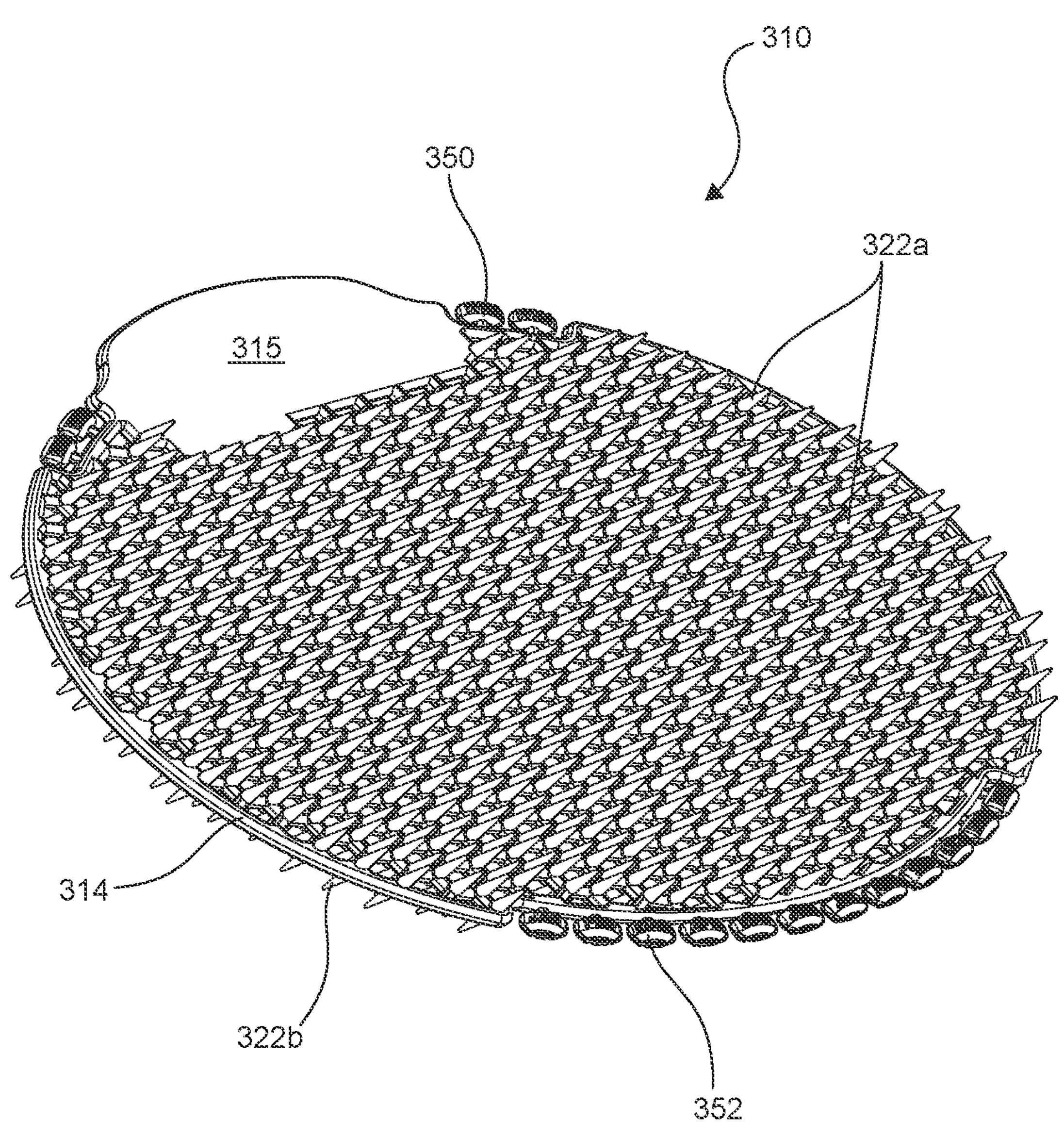
FIG. 14 is a top perspective view of another urinal screen.
Figure 15:
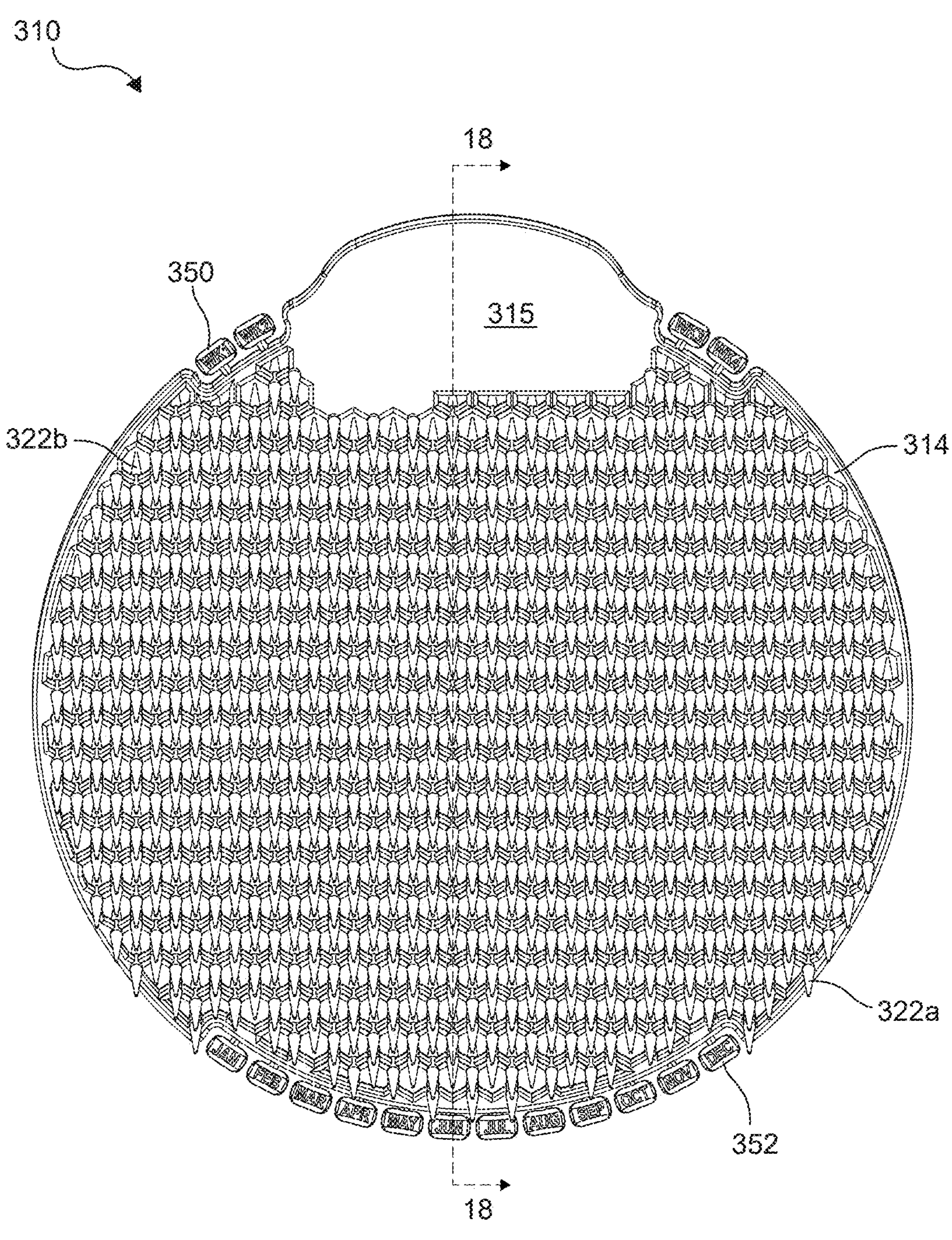
FIG. 15 is a top plan view of the urinal screen of FIG. 14.

As illustrated in FIG. 13, a plurality of the first and second sets of posts 222*a*, 222*b* can have a non-linear shape. For example, one or more of the posts 222*a*, 222*b* can include a bend, curve, or other change of direction along the length of the post 222*a*, 222*b*. In the illustrated embodiments, the posts 222*a*, 222*b* include a base portion 262*a*, 262*b*. The base portion 262*a*, 262*b* of the posts can extend from the respective face 226, 230 of the frame 214. In some embodiments, the base portions 262*a*, 262*b* extend from the faces 226, 230 at right angles or at slanted angles (e.g., angles between 0° and 90°) with respect to the faces 226, 230. The posts 222*a*, 222*b* can include bends 264*a*, 264*b* or curved portions wherein the length of the posts 222*a*, 222*b* changes direction with respect to the base portions 262*a*, 262*b*. In some embodiments, the one or more of the posts 222*a*, 222*b* include end portions 266*a*, 266*b* extending from the bends 264*a*, 264*b* or other curved portions. The end portions 266*a*, 266*b*, can be straight, bent, curved, or otherwise shaped. An angle between the end portions 266*a*, 266*b* and the base portions 262*a*, 262*b* can be between 10° and 170°, between 30° and 110°, between 60° and 175°, between 75° and 100°, between 90° and 120°, between 80° and 135°, and/or between 70° and 160°. In some embodiments, the angle is approximately 90°.

As shown in FIG. 13, in some embodiments, an angle A3 between (1) a vector 277 that passes through the center of the connection point between the base portions 262*a* and the center of the ends of the end portions 266*a* opposite the base portions 262*a* of the posts 222*a* and (2) the first surface 226 of the frame 214 can be between 10° and 70°, between 30° and 60°, between 25° and 75°, between 45° and 85°, and/or between 40° and 50°. In some embodiments, the angle A3 is approximately 45°. Similarly, an angle A4 between (1) a vector 279 that passes through the center of the connection point between the base portions 262*b* and the center of the ends of the end portions 266*b* opposite the base portions 262*b* of the posts 222*b* and (2) the second surface 230 of the frame 214 can be between 10° and 70°, between 30° and 60°, between 25° and 75°, between 45° and 85°, and/or between 40° and 50°. In some embodiments, the angle A4 is approximately 45°.

Figure 12:
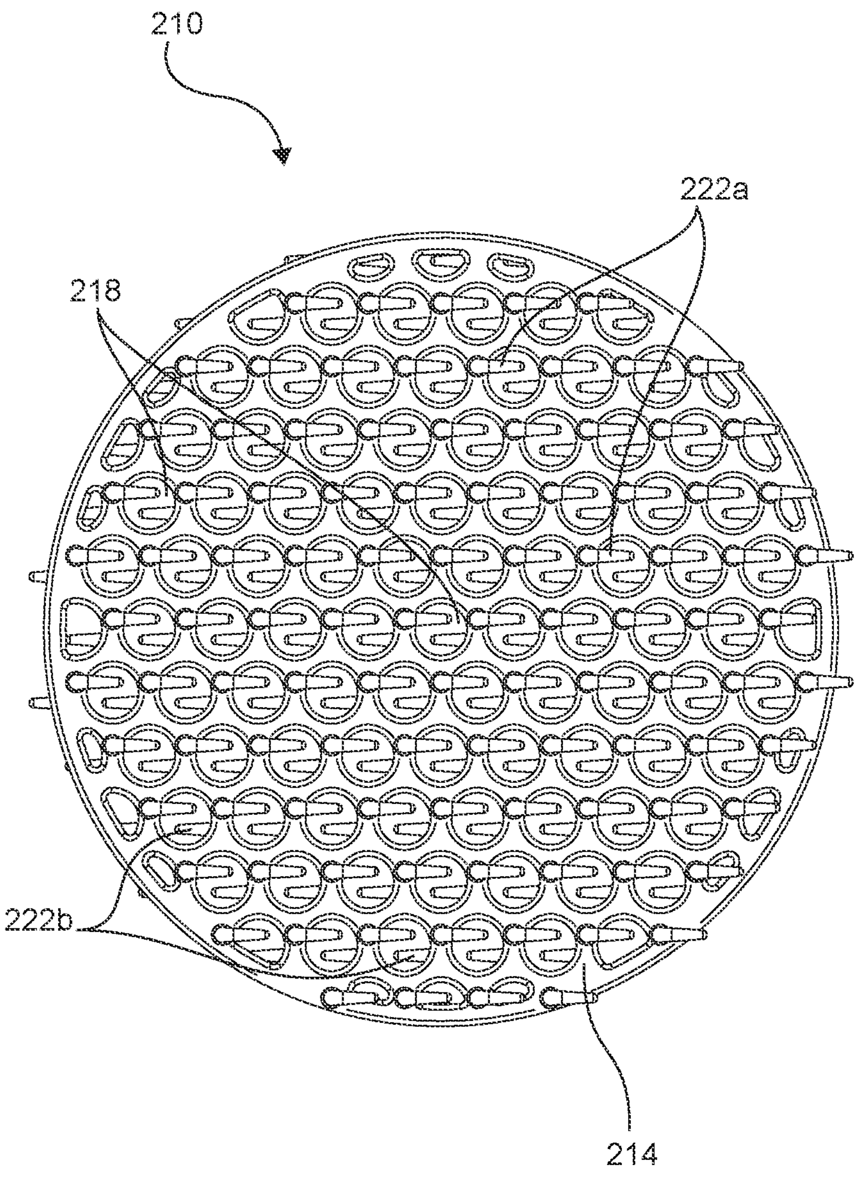
FIG. 12 is a top plan view of the urinal screen of FIG. 10.

As illustrated in FIG. 12, the posts 222*a*, 222*b* can extend across the openings 218 in the frame 214. Extending the posts 222*a*, 222*b* across the openings 218 can increase the likelihood that urine impinges on the posts 222*a*, 222*b* dissipate splash.

In some embodiments, the embodiment illustrated in FIGS. 10-13 (and/or other embodiments comprising nonlinear posts), can be produced using a manufacturing process comprising at least two steps. For example, a urinal screen may be molded with linear posts. A secondary operation may then bend or otherwise deform or change the shape of the linear posts such that they are nonlinear. In some embodiments, a urinal screen may be molded or otherwise manufactured with posts that are either linear or nonlinear, and a secondary operation may then be used to change the shape of the posts, such as through plastic deformation of the posts. For example, in some embodiments, a secondary operation may comprise placing the urinal screen between two surfaces (for example, between two dies of a mold) that are then compressed together and cause the ends of the posts to bend over. In some embodiments, this may be described as compressing, bending, smashing, mushing, or otherwise deforming the posts. In some embodiments, the equipment used to deform the posts may comprise the ability to heat the posts to make them more susceptible to bending or deforming while being compressed. In some embodiments, such a secondary operation can be done in a heated environment, such as an oven, to make the posts more susceptible to deformation. In some embodiments, such a secondary operation may still result in linear or substantially linear shaped posts, similar to as shown in FIG. 5, instead of a nonlinear post, as shown in FIG. 13. In some embodiments, nonlinear posts as illustrated in FIG. 13 are not created by a secondary operation. For example, they may be 3D printed, molded, or otherwise produced. In some embodiments, however, it may be desirable to use a secondary operation to make the manufacturing process easier and/or cheaper.

FIGS. 14-18 illustrate an embodiment of a urinal screen 310 that shares characteristics with the urinal screen 10 illustrated in FIGS. 1-5. For example, the urinal screen 310 has a frame 314 that shares characteristics with the frame 14 of urinal screen 10. Unless otherwise explained below, features of the urinal screen 310 that share the last two numerical digits (e.g., openings 318 and openings 18, tabs or solid cells 350 and tabs or solid cells 50, tabs or solid cells 352 and tabs or solid cells 52, large solid cell 315 and large solid cell 15, sides/braces 342 and sides/braces 42, surface 326 and surface 26, and surface 330 and surface 30) with features of the urinal screen 10 share many or all structural and functional characteristics.

As explained above, and best illustrated in FIGS. 16 and 18, the base width 325 of the posts 322*a*, 322*b* can be greater than the tip width 329 of the posts. In some embodiments, the base width 325 of the posts is greater than the width 331 of the braces 42 of the frame 314. The posts 322*a*, 322*b* can have the same or similar width ratios between the bases and tips of the posts as those ratios described above with respect to the posts 22*a*, 22*b*. Further, the length 327 of the posts 322*a*, 322*b* can be greater than a height of the posts 322*a*, 322*b* measured perpendicular to the surface of the frame (for example, height 39 or 41 shown in FIG. 3). The posts 322*a*, 322*b* can have the same or similar ratios of post length to height as described above with respect to posts 22*a*, 22*b*.

Figure 19:
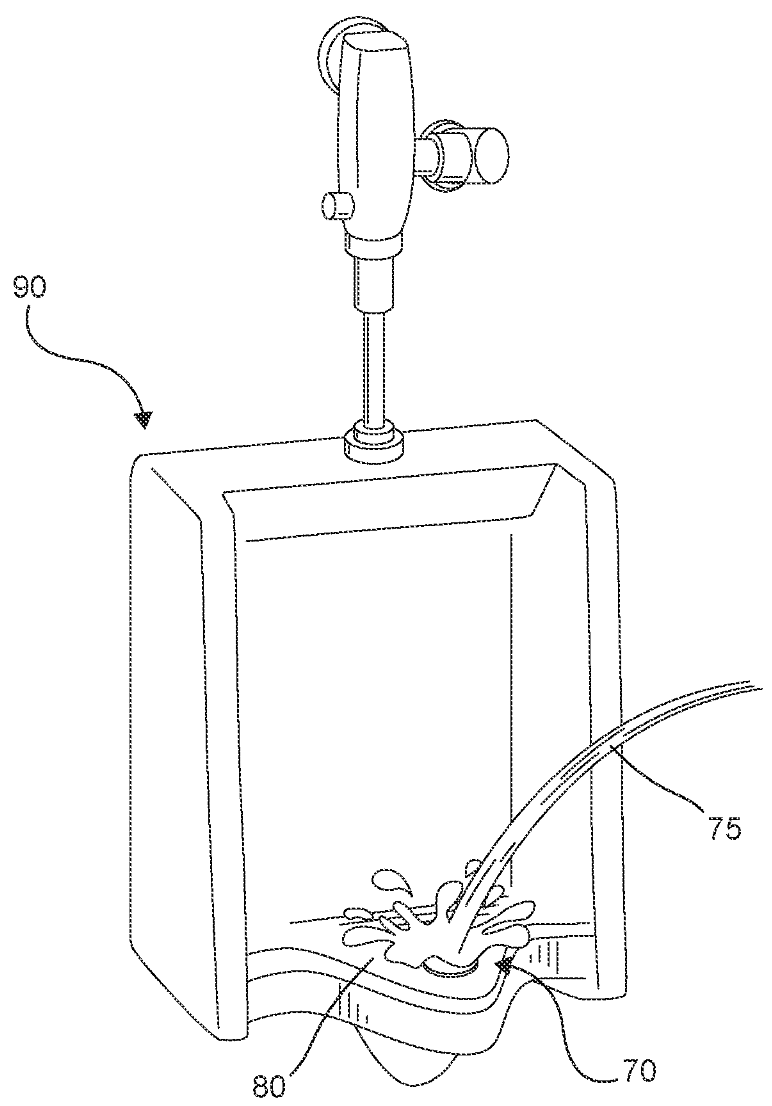
FIG. 19 is a perspective view of a urinal.
Figure 20:
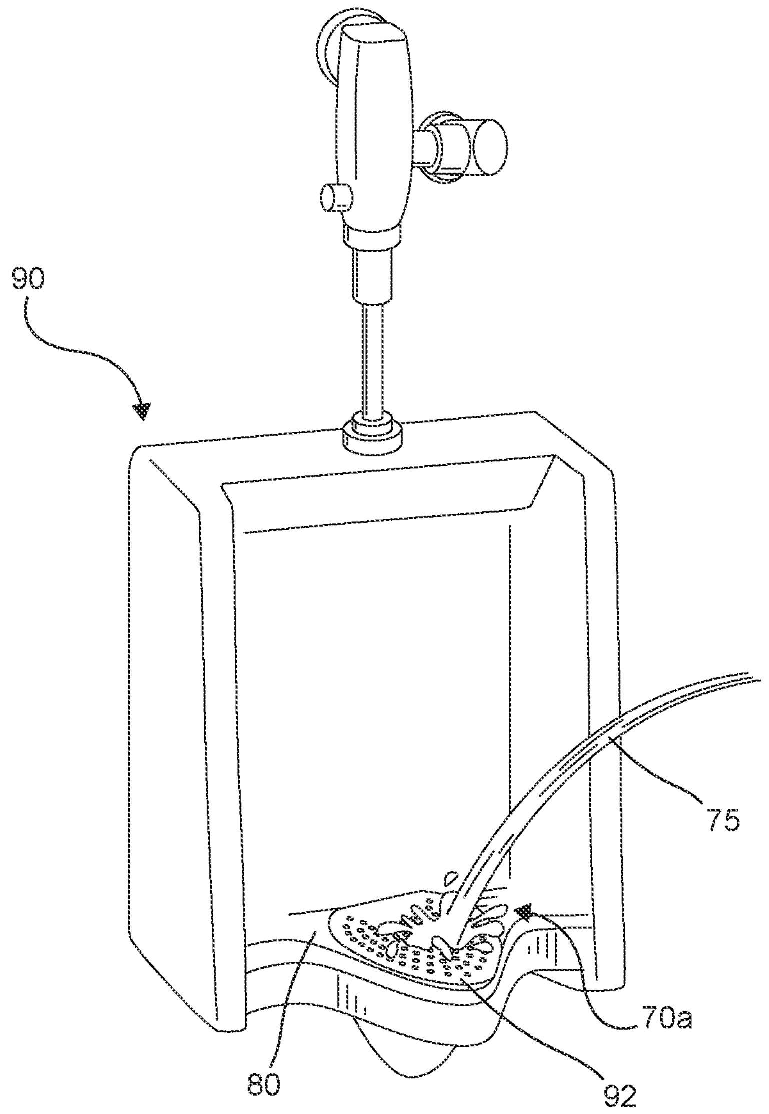
FIG. 20 is a perspective view of a urinal with a urinal screen installed on the bottom surface of the urinal.
Figure 21:
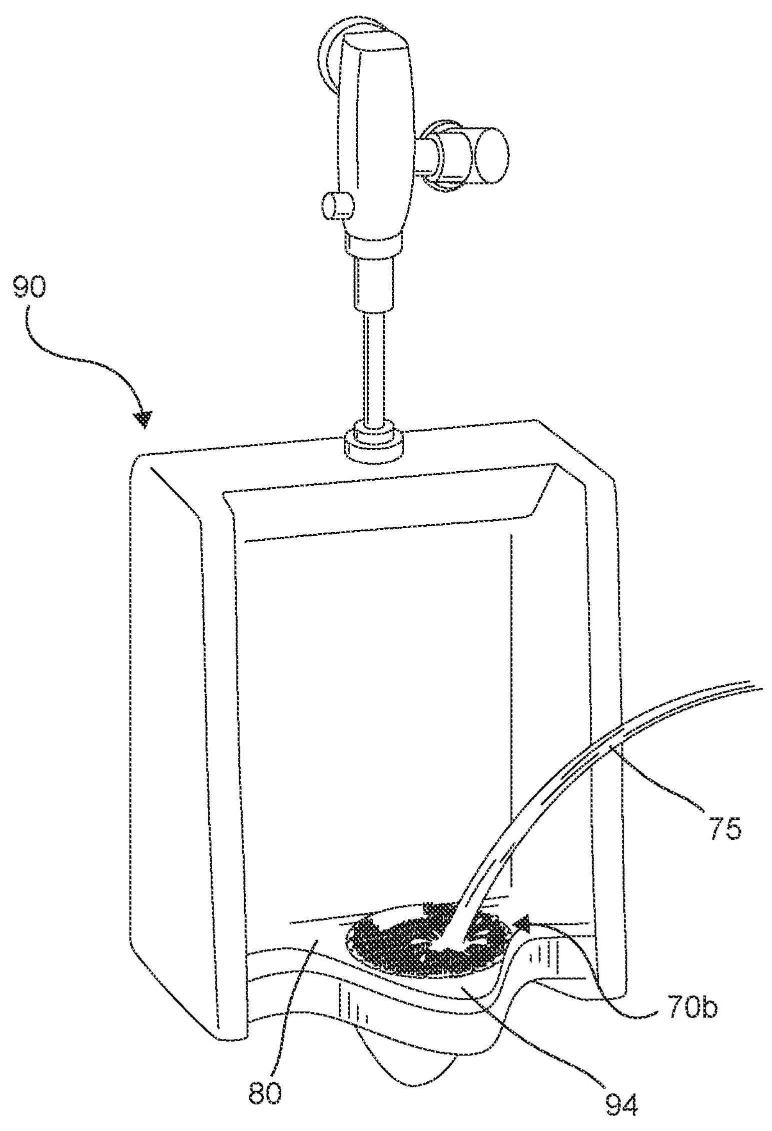
FIG. 21 is a perspective view of a urinal with another urinal screen installed on the bottom surface of the urinal.

FIGS. 19-23 illustrate splash dissipation of various urinal screen (or lack thereof) configurations. For example, as illustrated in FIG. 19, the splash 70 of a urine stream 75 off of the bottom surface 80 of a urinal 90 can be relatively large. When a flat (e.g., without protrusions) urinal screen 92 is positioned on the bottom surface 80 of the urinal 90, the splash 70*a* can be reduced, as illustrated in FIG. 20. For example, openings in the urinal screen 92 can capture some portion of the urine stream 75 to reduce splash. As illustrated in FIG. 21, use of a urinal screen 94 with small protrusions on one side can further reduce splash 70*b* of the urine stream 75. Namely, the protrusions extending upward from the screen 94 will dissipate splash of a portion of the urine stream 75. In many cases using a screen 94 with protrusions, splash is reduced by upwards of 60% as compared to a urinal 90 without a screen.

Figure 22:
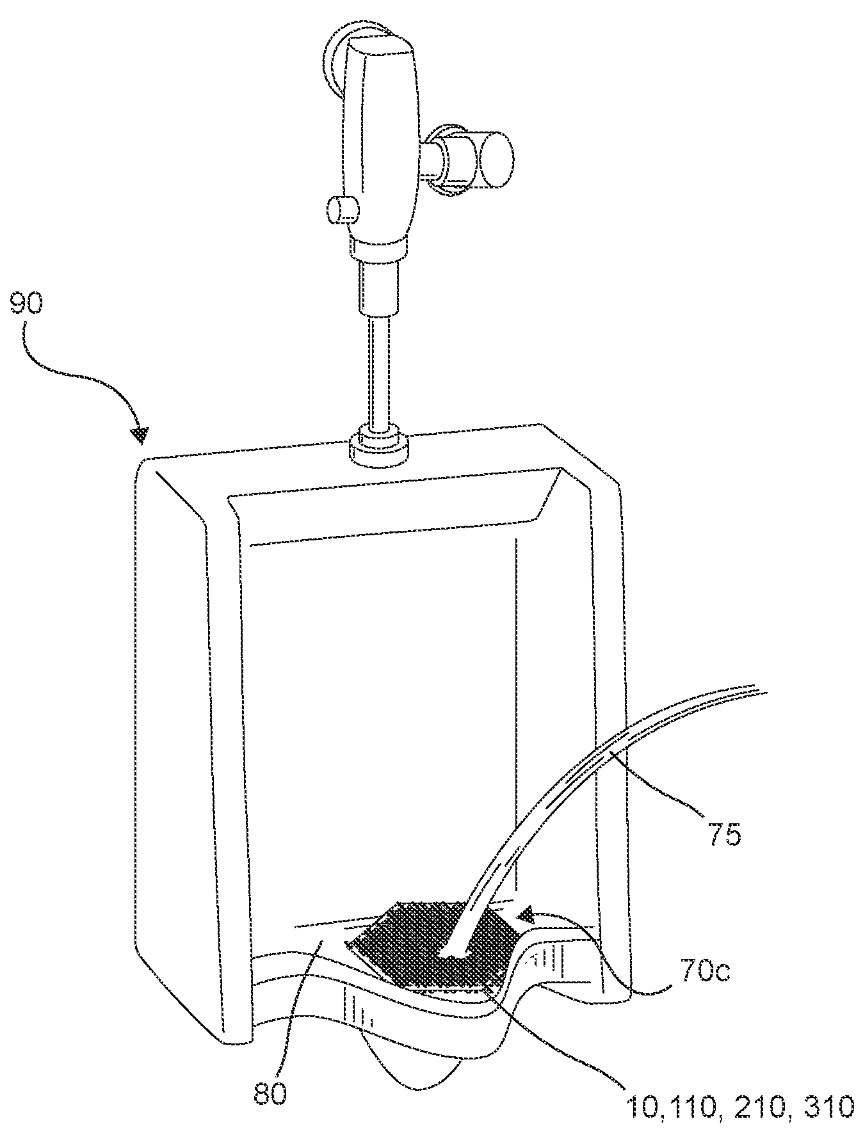
FIG. 22 is a perspective view of a urinal with a urinal screen of FIG. 1 or FIG. 6 installed on the bottom surface of the urinal.
Figure 23:
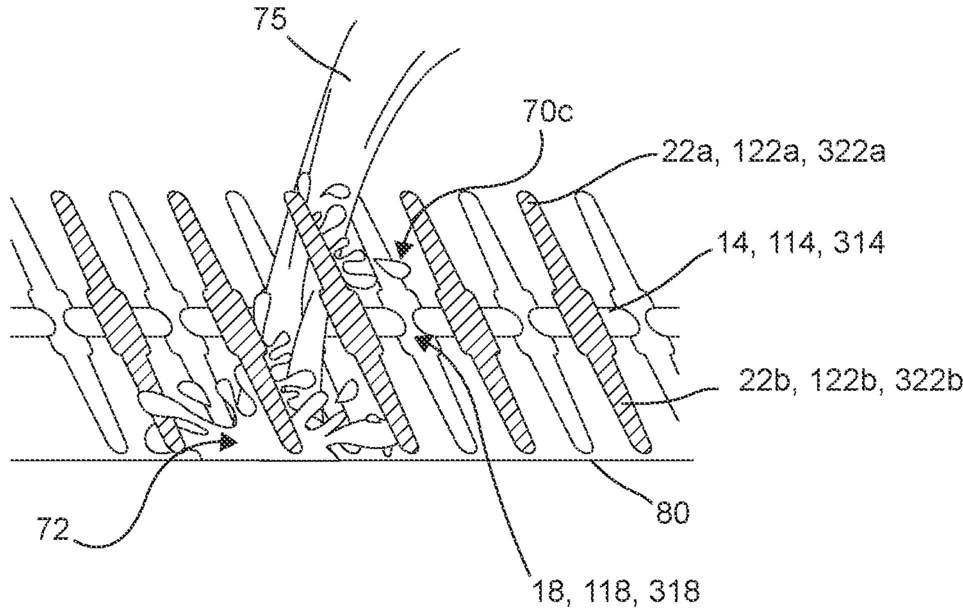
FIG. 23 is a cross-section view of a urinal screen of FIG. 1 or 6, installed on the bottom surface of a urinal.

FIGS. 22 and 23 illustrate use of a screen 10, 110, 310 (described above) in a urinal 90. As illustrated, the splash 70*c* from the urine stream 75 is even further reduced as compared to the splash reduction realized through use of the screen 94 in FIG. 21. In some cases, splash is reduced between 95%-98%, as compared to a urinal 90 without a screen. A number of factors can contribute to the reduced splash 70*c*. As illustrated in FIG. 23, much of the splash is dissipated by the protrusions 22*a*, 122*a*, 322*a* extending upward from the frame 14, 114, 314. Portions of the urine stream 75 that get past the upper protrusions 22*a*, 122*a*, 322*a* can impact the lower protrusions 22*b*, 122*b*, 322*b* further dissipating splash. Additionally, portions of the urine stream 75 that get past both the upper and lower protrusions 22*a*, 22*b*, 122*a*, 122*b*, 322*a*, 322*b* to impact the lower surface 80 may splash back upward as "backsplash" 72. Backsplash 72 is defined as any portion of the urine stream 75 that splashes upward beyond a top of the urinal screen (for example, beyond the uppermost ends of the upper protrusions 22*a*, 122*a*, 322*a*) after impacting the urinal screen and/or the bottom surface 80 of the urinal. For portions of the urine stream 75 that impact the bottom surface 80 of the urinal, the backsplash 72 will desirably largely impact the lower protrusions 22*b*, 122*b*, 322*b*, frame 14, 114, 314, and upper protrusions 22*a*, 122*a*, 322*a*, each of which reduce the amount of backsplash that splashes back upward of the screen 10, 110, 310. In some embodiments, a number of structures of the urinal screen work together to progressively reduce backsplash. For example, with reference to FIG. 23, a flow of the urine stream 75 through the urinal screen may begin with the urine stream 75 impacting the upper protrusions 22*a*, 122*a*, 322*a*. Then, the urine stream 75 may pass through the openings 18, 118, 318, and may impact the frame 14, 114, 314 while passing through the openings 18, 118, 318. Next, the urine stream 75 may impact the lower protrusions 22*b*, 122*b*, 322*b*. After impacting the bottom surface 80 of the urinal, the urine stream 75 may again impact the lower protrusions 22*b*, 122*b*, 322*b*. Next, the urine stream 75 may again pass through the openings 18, 118, 318, and may impact the frame 14, 114, 314 while passing through the openings 18, 118, 318. Then, the urinal stream 75 may again impact the upper protrusions 22*a*, 122*a*, 322*a*. At each of these stages in the flow of the urine stream 75 downward through the urinal screen and back upward through the urinal screen, the impact of the urine stream 75 on a structure of the urinal screen may result in more energy being dissipated from the urine stream 75 and/or less urine continuing on to the next stage of the flow. Accordingly, desirably, the backsplash, if any, that splashes upward beyond the top of the urinal screen is reduced. Reduction of urine splash and/or backsplash is desirable for many reasons, including, but not limited to, cleanliness of bathroom facilities, reduction of impact of urine on the person using the urinal, and reduced odor in the bathroom facilities. The various embodiments disclosed herein can reduce backsplash such that no more than 5% of a urine stream directed onto the urinal screen splashes back upward above the top of the urinal screen. In some embodiments, the urinal screen can reduce backsplash such that no more than 2%, 10%, or 15% of a urine stream directed onto the urinal screen splashes back upward above the top of the urinal screen.

Figure 24A:
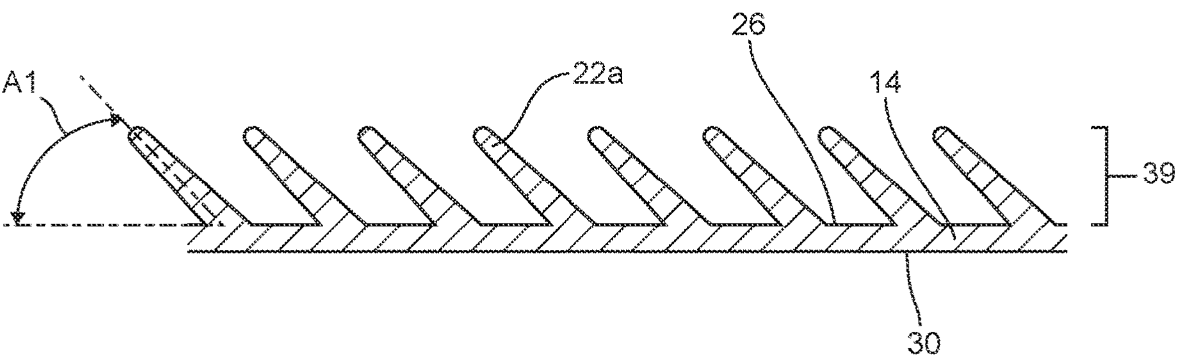
FIG. 24A is a cross-sectional schematic view of another embodiment of a urinal screen.
Figure 24B:
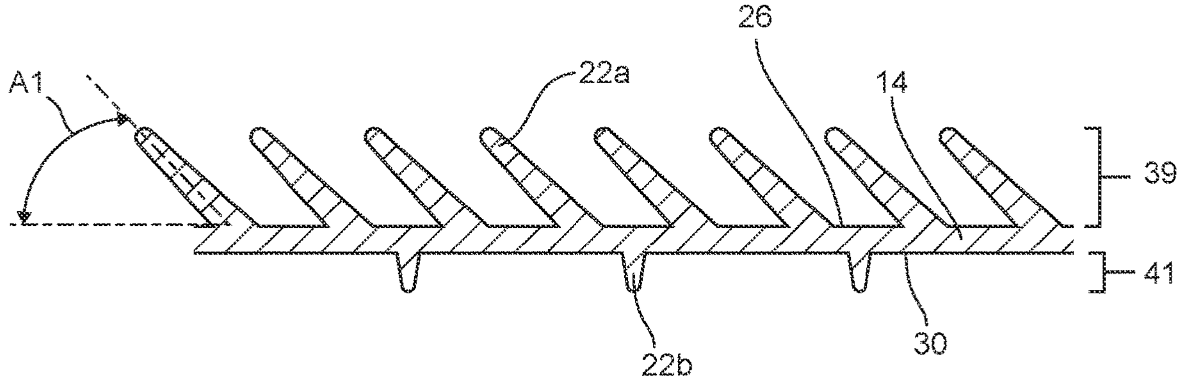
FIG. 24B is a cross-sectional schematic view of another embodiment of a urinal screen.

Although most of the embodiments described herein and illustrated in the figures have been described as having posts 22*a*, 22*b* extending from both the top and bottom surfaces 26, 30 of a urinal screen, the concepts disclosed herein may also be used with urinal screens that have posts extending from only one side of the urinal screen and/or urinal screens that have posts extending at a non-perpendicular angle from one side of the urinal screen and at a perpendicular angle from another side of the urinal screen. FIGS. 24A and 24B illustrate schematic cross-sectional views of example embodiments of such urinal screens. FIG. 24A illustrates a schematic cross-sectional view of a urinal screen comprising a frame 14 and a plurality of posts 22*a* extending from the top surface 26, but no posts extending from the bottom surface 30. In this embodiment, the posts 22*a* extend from the top surface 26 at non-perpendicular angle A1, which may take any value as described elsewhere herein with respect to angle A1. The posts 22*a* may also comprise a height 39, as described elsewhere herein.

FIG. 24B illustrates another embodiment similar to the embodiment of FIG. 24A, except the embodiment of FIG. 24B additionally comprises a plurality of posts 22*b* extending from the bottom surface 30 of the frame 14. In this embodiment, the bottom posts 22*b* extend from the frame 14 at a perpendicular angle to surface 30 or 26, and the top posts 22*a* extend from the frame 14 at non-perpendicular angle A1. In this embodiment, the bottom posts 22*b* comprise a smaller height 41 than the height 39 of the top posts 22*a*. In some embodiments, the bottom posts 22*b* comprise a height 41 that is approximately 25% of the top height 39. For example, the bottom post height 41 may be approximately 2 millimeters, and the top height 39 may be approximately 8 millimeters. In various other embodiments, the ratio of bottom post height 41 to top post height 39 may be different. For example, in some embodiments the bottom post height 41 may be less than the top post height 39. In some embodiments, the bottom post height 41 may be equal to the top post height 39. In some embodiments, the bottom post height 41 may be no greater than 20%, 30%, 40%, or 50% of the top post height 39. It may be desirable for the bottom post height 41 to be smaller than the top post height 39, because the bottom and top posts 22*b*, 22*a* may be intended to perform different functions. For example, the bottom posts 22*b* may be used primarily to space of the bottom surface 30 away from the surface of the urinal. The top post 22*a*, on the other hand, may be used primarily to prevent splashing and/or capture hair or other debris that enters the urinal. Accordingly, it may be desirable to position at least one post 22*a* adjacent each opening through the frame 14. For similar reasons, it may be desirable to have more top posts 22*a* than bottom posts 22*b*. For example, there may be 1.5×, 2.0×, 2.5×, 3.0×, 3.5×, or 4.0× as many top posts 22*a* as bottom posts 22*b*. In some embodiments, the bottom post height 41 is desirably equal to or greater than a height of the frame, measured perpendicular to the surface 26.

It should be noted that, because FIGS. 24A and 24B are schematic views intended to illustrate the configuration of the posts 22*a* and 22*b*, the frame 14 is not illustrated with any openings. The concepts shown in these figures for the posts 22*a* and 22*b* may be used with urinal screens as described elsewhere herein, however, which include a plurality of openings through the frame 14.

Figure 25A:
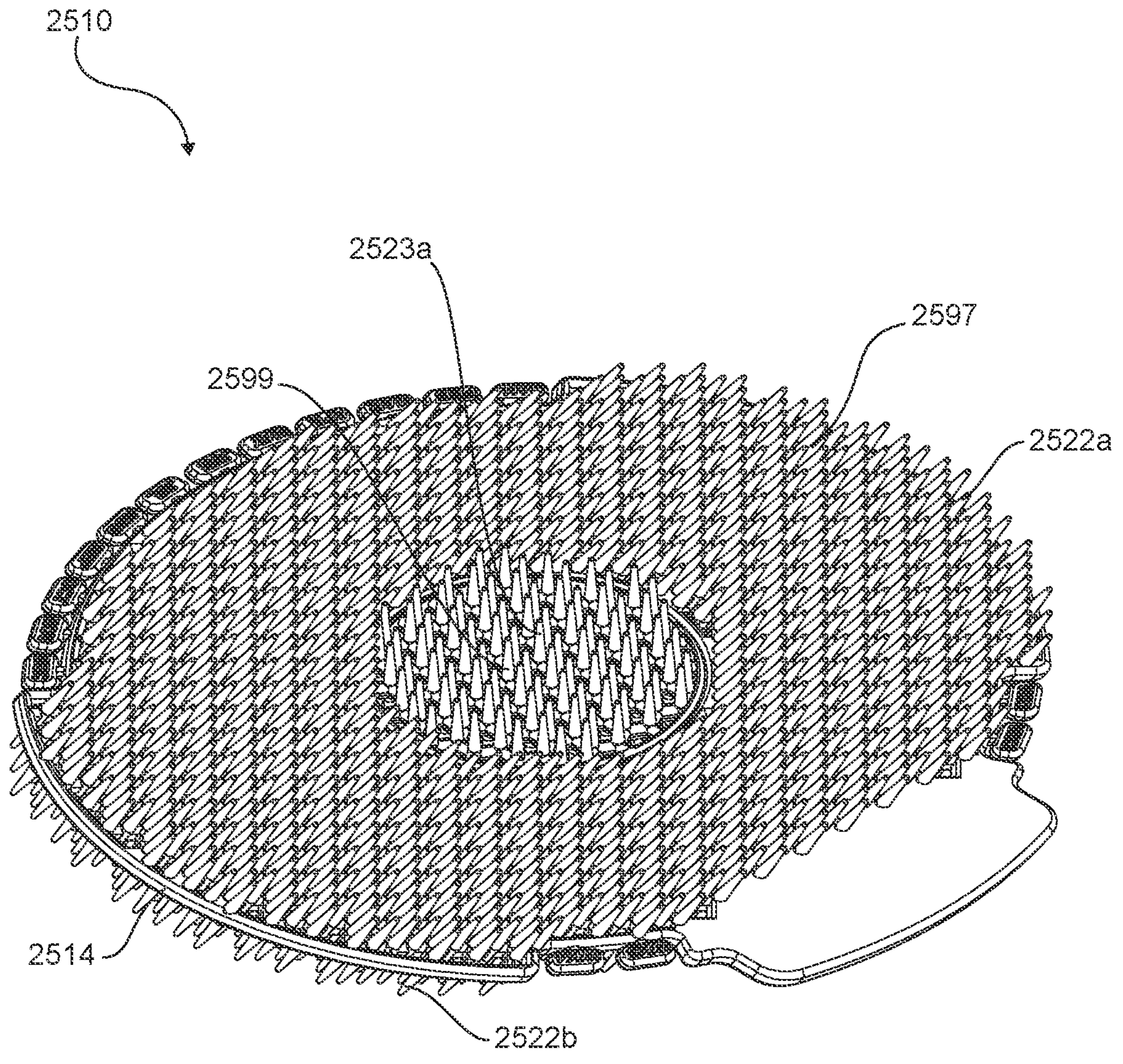
FIG. 25A is a top perspective view of another embodiment of a urinal screen.
Figure 25B:
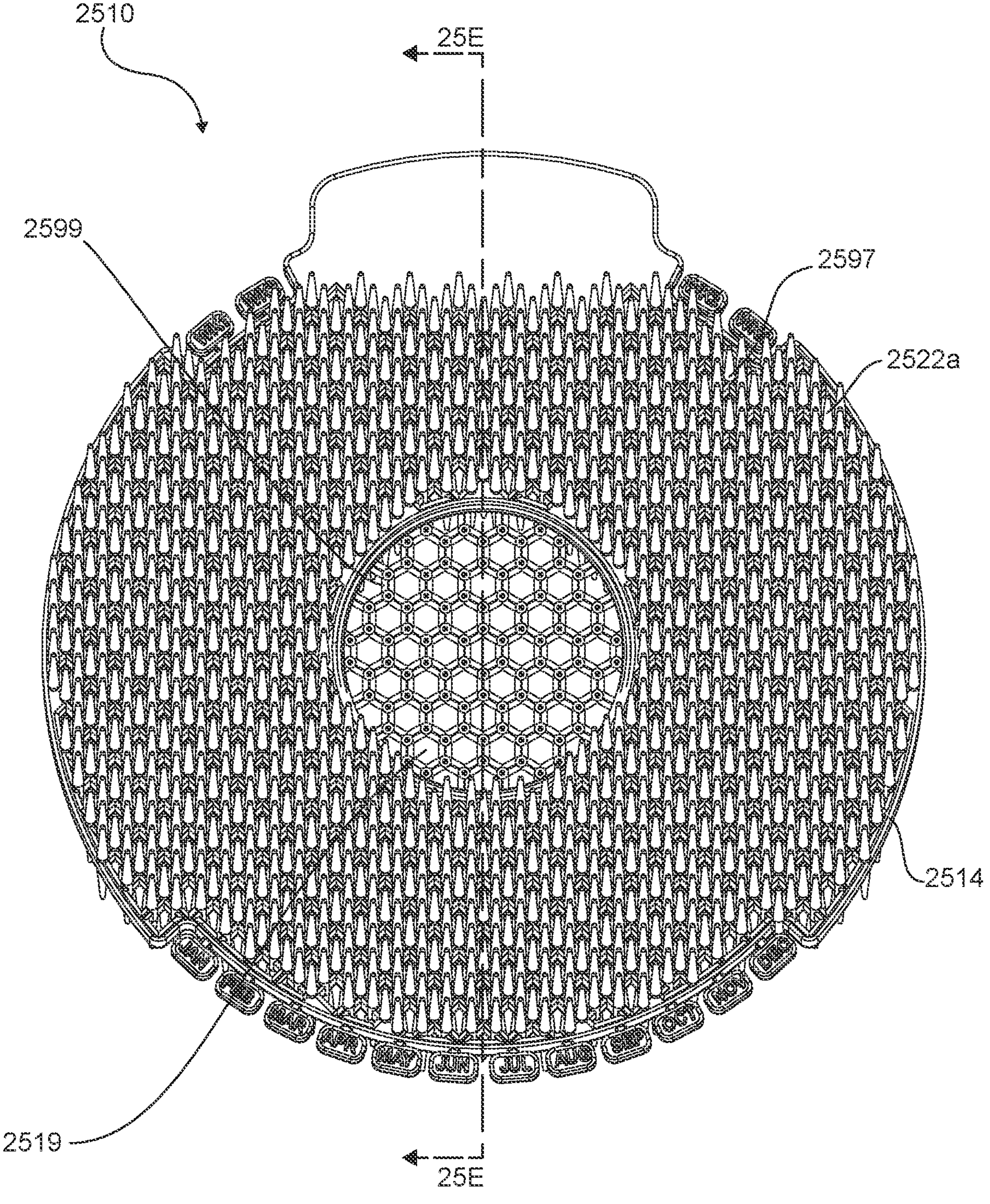
FIG. 25B is a top plan view of the urinal screen of FIG. 25A.
Figure 25C:
FIG. 25C is a front plan view of the urinal screen of FIG. 25A.
Figure 25C:
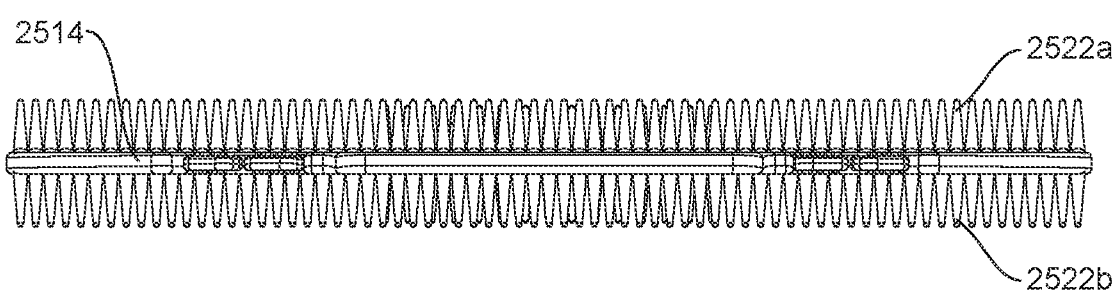
Figure 25D:
FIG. 25D is a side plan view of the urinal screen of FIG. 25A.
Figure 25D:
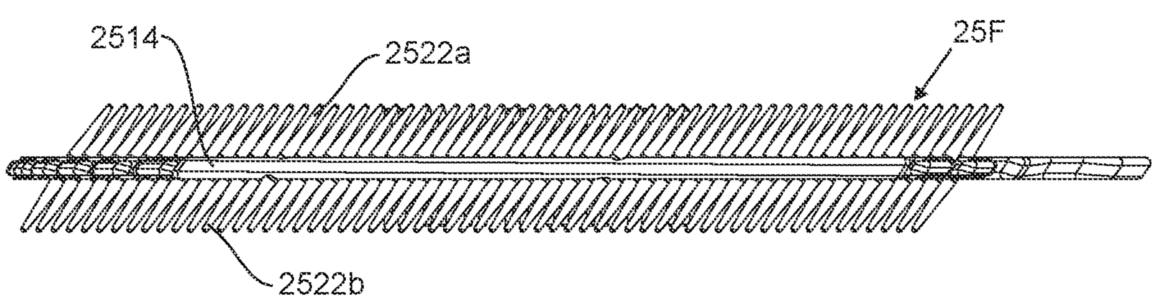
Figure 25E:
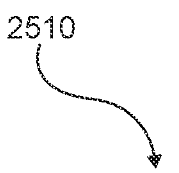
FIG. 25E is a cross-sectional side plan view of the urinal screen of FIG. 25A.
Figure 25E:
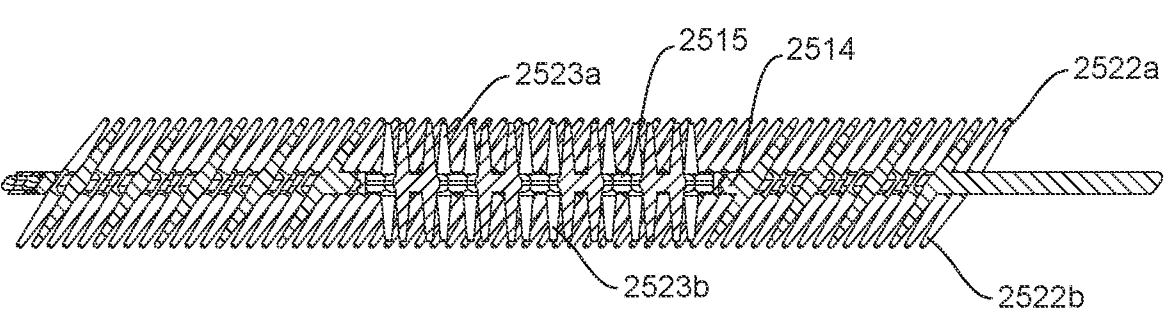
Figure 25F:
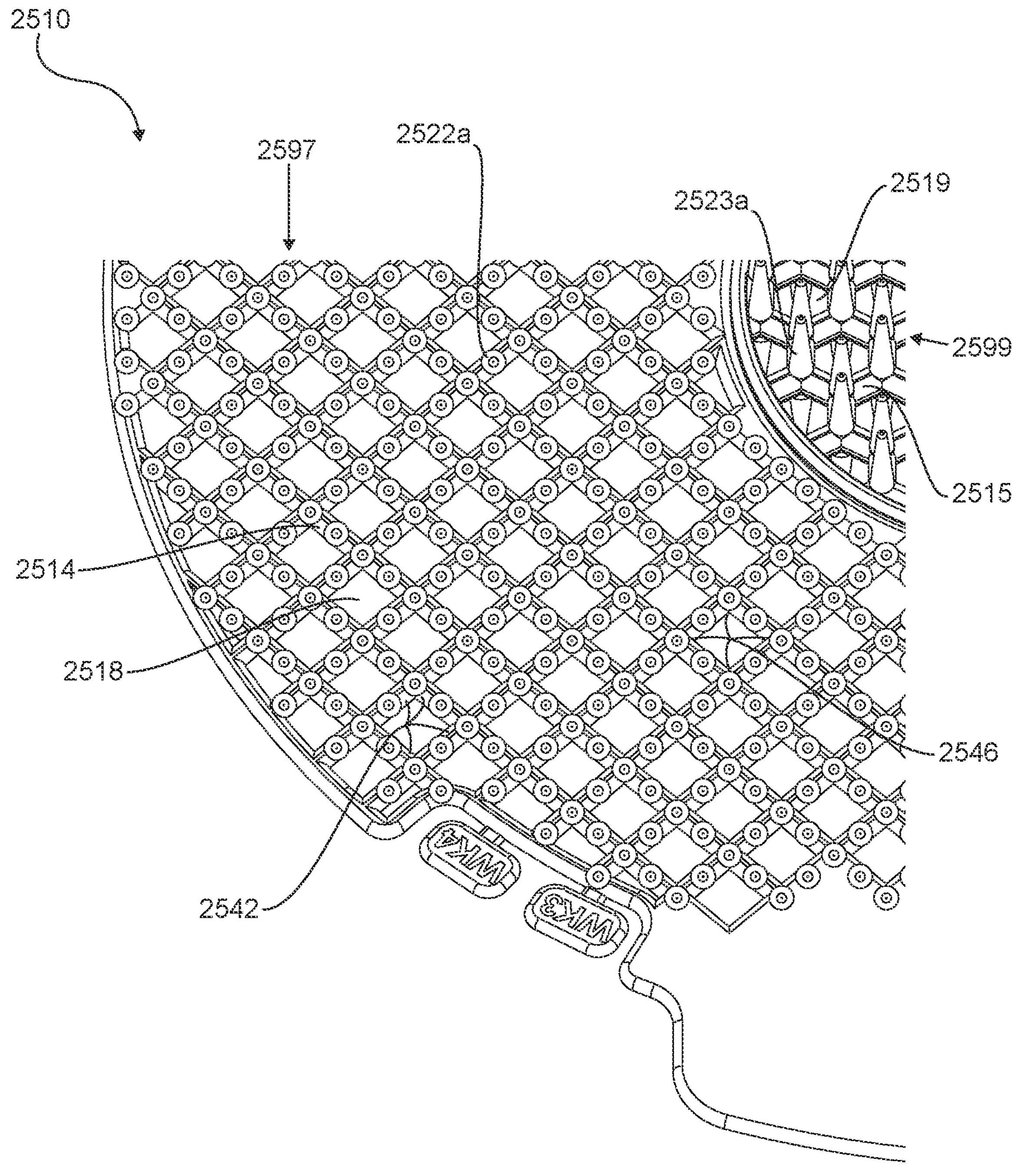
FIG. 25F is a close up top perspective view of the urinal screen of FIG. 25A.

FIGS. 25A-25F illustrate another embodiment of a urinal screen 2510. FIG. 25A is a top perspective view of the urinal screen 2510. FIG. 25B is a top plan view of the urinal screen 2510. FIG. 25C is a front plan view of the urinal screen 2510. FIG. 25D is a side plan view of the urinal screen 2510. FIG. 25E is a cross-sectional side plan view of the urinal screen 2510. The cross-sectional view of FIG. 25E is taken through the cross-sectional plane shown in FIG. 25B. FIG. 25F is a close-up top perspective view of the urinal screen 2510. The orientation of the perspective view of FIG. 25F is shown in FIG. 25D.

The urinal screen 2510 is similar in many respects to other urinal screens disclosed herein, such as urinal screen 10 illustrated in FIGS. 1-5. Similar reference numbers are used to refer to similar features. Further, for brevity, the present description of the urinal screen 2510 focuses on differences of the urinal screen 2510 with respect to other urinal screens disclosed herein, and any features of other urinals screens disclosed herein may be included in the urinal screen 2510 or variations thereof.

With reference to FIG. 25A, the urinal screen 2510 comprises a frame 2514 having a plurality of openings passing therethrough and a plurality of posts extending therefrom, similar to other urinal screens disclosed herein. For example, the urinal screen 2510 comprises a plurality of posts 2522*a* extending from a top of the frame 2514, and a plurality of posts 2522*b* extending from a bottom of the frame 2514. Further, the frame 2514 comprises a plurality of openings 2518 passing therethrough (see FIG. 25F). The posts 2522*a*, 2522*b* may take any form or shape, such as any form or shape described herein with reference to other posts, and may extend from the frame 2514 at a perpendicular angle or at any of the non-perpendicular angles described herein with reference to other embodiments. In the present embodiment, as shown in FIGS. 25D and 25E, the top and bottom posts 2522*a*, 2522*b* desirably extend from the frame 2514 at non-perpendicular angles with respect to the top and bottom faces of the frame 2514.

One difference in the urinal screen 2510 with respect to the urinal screen 10 of FIG. 1 is that urinal screen 2510 comprises multiple regions of posts and openings. With reference to FIG. 25A, the urinal screen 2510 comprises an outer portion or region 2597 and an inner portion or region 2599. The outer and inner regions 2597, 2599 may each comprise, for example, differently shaped posts, differently shaped openings through the frame, posts that are oriented at different angles, different distributions of posts, posts and/or frame structures that are different colors, posts and/or frame structures that comprise different materials, and/or the like. Further, the junction between the outer region 2597 and inner region 2599 may take any shape, such as circular (as shown in the present embodiment), square, triangular, oval, jagged, a junction that follows the shape of the perimeter of openings or cells in the frame, and/or the like. In some embodiments, it is desirable for the inner region to be centered within the outer region (as shown in FIG. 25B), although other embodiments may not have the inner region centered within the outer region. Further, some embodiments may comprise more than two different regions, such as three, four, five, six, or more regions. In some embodiments, a urinal screen may comprise a single region which uses the post and frame structure of the outer region 2597 or the inner region 2599 of the urinal screen 2510. For example, an alternative embodiment of the urinal screen 2510 may not include the inner region 2599, and may use the structure of the outer region 2597 for the entire area of the urinal screen that comprises posts and openings (e.g., similar to the urinal screen 10 of FIG. 1, except using the post and frame structure of the outer region 2597 of urinal screen 2510).

In some embodiments, it may be desirable to have multiple regions of posts and/or openings (such as outer region 2597 and inner region 2599) for various reasons. For example, one region, such as the inner region 2599, may be intended to form a "target" for a user of the urinal to direct a urine stream upon. Further, it may be desirable to have different splash dissipation characteristics between multiple regions. For example, the outer region 2597 may comprise a more dense distribution of posts that are intended to provide greater splash dissipation than a less dense distribution of posts in the inner region 2599. As another example, the outer region 2597 may comprise angled posts, while the inner region may comprise non-angled posts, for similar reasons (e.g., to provide greater splash dissipation in the outer region). This may be desirable, for example, because when a urinal screen is placed centered over a drain in the bottom of a urinal, a stream of urine directed further from the drain may be more likely to splash back onto the user than a stream of urine directed directly onto the drain.

With further reference to FIG. 25A, in the urinal screen 2510, the outer region 2597 comprises top and bottom posts 2522*a* and 2522*b* that are oriented at a non-perpendicular angle with respect to a face of the frame 2514. Further, the inner region 2599 comprises top and bottom posts 2523*a* and 2523*b* (see FIG. 25E) that are oriented at a perpendicular angle with respect to a face of the frame 2514 (or with respect to a face of a second frame 2515 of the inner region, shown in FIG. 25E). In some embodiments, the outer region 2597 and inner region 2599 are formed as part of a single integrated structure, such as a single injection molded product. In some embodiments, however, one of the outer or inner regions 2597, 2599 may be manufactured first, and then combined with the other of the outer or inner regions 2597, 2599 during a secondary operation. For example, the two regions may be molded separately and then attached together using, for example, adhesive, friction welding, laser welding, and/or the like. As another example, one region may be produced first, and an insert molding process may be used to attach the first region to the second region as the second region is molded.

With reference to FIGS. 25B and 25F, it can be seen that the inner and outer regions 2599, 2597 also comprise differently shaped frame structures and distributions of post. For example, the inner region 2599 comprises a frame 2515 that comprises a plurality of sides or braces connecting at corners to form hexagonal-shaped cells and openings 2519, similar to the hexagonal-shaped cells and openings of the urinal screen 10 shown in FIG. 4. Further, similar to the configuration shown in FIG. 4, the inner region 2599 of urinal screen 2510 comprises a plurality of posts 2523*a*, 2523*b* extending from corners of the frame structure, although any other configuration disclosed herein may be used.

With reference to FIG. 25F, the outer region 2597 of the urinal screen 2510 comprises a differently shaped structure than the inner region 2599. In this embodiment, the frame 2514 comprises a plurality of diamond shaped openings 2518 that are formed by sides or braces 2542 that connect at corners 2546. As with other embodiments disclosed herein, the sides or braces 2542 may or may not comprise a sidewall that is oriented to be parallel to the angled posts 2522*a*, 2522*b*. Another difference in the structure of the outer region 2597 versus the frame structure of the urinal screen 10 of FIG. 4 is that the urinal screen 2510 shown in FIG. 25F comprises a plurality of posts 2522*a*, 2522*b* extending from both the corners 2546 and the midpoints of the braces or sidewalls 2542. Such a configuration may be desirable, for example, because a larger number of posts may be able to be used, which may lead to a denser distribution of posts and/or better splash dissipation. Although the urinal screen 2510 comprises posts extending from both the corners and midpoints of the braces, other embodiments may use more or fewer posts and/or may position the posts differently, such as extending from the sides or braces 2542 from a position that is not the midpoint.

Any of the embodiments disclosed herein may comprise a thermochromic paint on all or a portion of the urinal screen. A thermochromic paint may be desirable, for example, to enable a portion or all of the urinal screen to change color in response to urine hitting the urinal screen. This may, for example, help to incentivize users of the urinal to direct their urine onto the urinal screen, which may result in less splashing than if the urine were directed elsewhere. In some embodiments, the entire urinal screen can be painted with thermochromic paint. In other embodiments, a certain percentage of the urinal screen may be painted with thermochromic paint. For example, at least 20%, 30%, 40%, 50%, 60%, 70%, 80%, or 90% of the urinal screen may be painted with thermochromic paint. In some embodiments, the urinal screen may comprise multiple regions (such as outer and inner regions 2597, 2599 of urinal screen 2510), with at least one of the multiple regions comprising thermochromic paint, and at least one of the multiple regions not comprising thermochromic paint. In some embodiments, between 25 and 75% of the urinal screen may be painted with thermochromic paint. In some embodiments, other techniques may be used, such as incorporating thermochromic paint or pigments into the material of the urinal screen, instead of performing a secondary painting operation. In some embodiments, the thermochromic paint or pigment is configured such that the urinal screen changes color in response to urine that is at a standard human body temperature (for example, the paint changes color at approximately 86° F., within a range of 80 to 90° F., above 80° F., above 86° F., and/or the like), and that reverts to its normal color in response to an ambient temperature, such as around 70° F., below 80° F., and/or the like.

For expository purposes, the term "horizontal" as used herein is defined as a plane parallel to the plane or surface of the floor of the area in which the system being described is used or the method being described is performed, regardless of its orientation. The term "floor" can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

While the preferred embodiments of the present inventions have been described above, it should be understood that they have been presented by way of example only, and not of limitation. It will be apparent to persons skilled in the relevant art that various changes in form and detail can be made therein without departing from the spirit and scope of the inventions. Thus, the present inventions should not be limited by the above-described exemplary embodiments, but should be defined only in accordance with the following claims and their equivalents. Furthermore, while certain advantages of the inventions have been described herein, it is to be understood that not necessarily all such advantages may be achieved in accordance with any particular embodiment of the inventions. Thus, for example, those skilled in the art will recognize that the inventions may be embodied or carried out in a manner that achieves or optimizes one advantage or group of advantages as taught herein without necessarily achieving other advantages as may be taught or suggested herein.

What is claimed is:

1. A method of manufacturing a urinal screen, the method comprising:

providing a plastic or EVA material; and molding the plastic or EVA material into a urinal screen sized and shaped to be disposed in a urinal and including the following features:

a planar frame having a first side and a second side, wherein the planar frame extends along a plane that is non-perpendicular to a first direction, the first direction being oriented at an angle of between 15 degrees and 75 degrees to the plane;

a plurality of apertures extending through the planar frame from the first side to the second side;

a first plurality of posts extending away from the first side of the planar frame, a longitudinal axis of each of the first plurality of posts extending along the first direction; and a second plurality of posts extending away from the second side of the planar frame, a longitudinal axis of each of the second plurality of posts extending along the first direction, such that the longitudinal axes of the second plurality of posts are parallel to the longitudinal axes of the first plurality of posts.

2. The method of claim 1, wherein the molding comprises molding the planar frame such that the plurality of apertures are each defined at least partially by a perimeter structure, the perimeter structure comprising an upper portion, a lower portion, and a side wall extending from the upper portion to the lower portion, wherein the side wall extends along the first direction, such that the side wall is parallel to the longitudinal axes of the first plurality of posts and the longitudinal axes of the second plurality of posts.

3. The method of claim 2, wherein the molding further comprises forming a convex radiused surface into the upper portion and forming a convex radiused surface into the lower portion.

4. The method of claim 1, wherein the molding comprises molding each of the first plurality of posts such that they each comprise a first end connected to the planar frame and a second end spaced from the planar frame, wherein the second end of each of a majority of the first plurality of posts is positioned to at least partially obstruct a view through one of the plurality of apertures when the urinal screen is observed normal to the planar frame.

5. The method of claim 4, wherein the molding further comprises molding each of the second plurality of posts such that they each comprise a first end connected to the planar frame and a second end spaced from the planar frame, wherein the second end of each of a majority of the second plurality of posts is positioned to at least partially obstruct a view through one of the plurality of apertures when the urinal screen is observed normal to the planar frame.

6. The method of claim 1, wherein the plurality of apertures produced by the molding are a majority of a total number of apertures that extend through the planar frame.

7. The method of claim 1, further comprising loading the plastic or EVA material with fragrance material prior to the molding.

8. The method of claim 1, further comprising adding at least one additive to the plastic or EVA material, the at least one additive selected from a list consisting of: bacteria, odor neutralizers, and silver ions.

9. A method of manufacturing a urinal screen, the method comprising:

providing a plastic or EVA material; and molding the plastic or EVA material into a urinal screen sized and shaped to be disposed in a urinal and including the following features:

a planar frame having a first side and a second side, wherein the planar frame extends along a plane that is non-perpendicular to a first direction, the first direction being oriented at an angle of between 15 degrees and 75 degrees to the plane;

a plurality of apertures extending through the planar frame from the first side to the second side, wherein the plurality of apertures are each defined at least partially by a perimeter structure, the perimeter structure comprising an upper portion, a lower portion, and a side wall extending from the upper portion to the lower portion, wherein the side wall extends along the first direction; and a first plurality of posts extending away from the first side of the planar frame, a longitudinal axis of each of the first plurality of posts extending along the first direction, such that the longitudinal axes of the first plurality of posts are parallel to the side walls of the perimeter structures of the plurality of apertures.

10. The method of claim 9, wherein the molding comprises forming a convex radiused surface into the upper portion and forming a convex radiused surface into the lower portion.

11. The method of claim 9, wherein the molding comprising molding each of the first plurality of posts such that they each comprise a first end connected to the planar frame and a second end spaced from the planar frame, wherein the second end of each of a majority of the first plurality of posts is positioned to at least partially obstruct a view through one of the plurality of apertures when the urinal screen is observed normal to the planar frame.

12. The method of claim 9, wherein the molding further comprises molding a second plurality of posts extending away from the second side of the planar frame, a longitudinal axis of each of the second plurality of posts extending along the first direction, such that the longitudinal axes of the second plurality of posts are parallel to the longitudinal axes of the first plurality of posts and the side walls of the perimeter structures of the plurality of apertures.

13. The method of claim 12, wherein the molding of the second plurality of posts comprises molding each of the second plurality of posts such that they each comprise a first end connected to the planar frame and a second end spaced from the planar frame, wherein the second end of each of a majority of the second plurality of posts is positioned to at least partially obstruct a view through one of the plurality of apertures when the urinal screen is observed normal to the planar frame.

14. The method of claim 9, wherein the plurality of apertures produced by the molding are a majority of a total number of apertures that extend through the planar frame.

15. The method of claim 9, further comprising loading the plastic or EVA material with fragrance material prior to the molding.

16. The method of claim 9, further comprising adding at least one additive to the plastic or EVA material, the at least one additive selected from a list consisting of: bacteria, odor neutralizers, and silver ions.

* * * * *